(12) United States Patent
Kitahara

(10) Patent No.: US 8,246,460 B2
(45) Date of Patent: Aug. 21, 2012

(54) GAME SYSTEM

(75) Inventor: Shinji Kitahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1227 days.

(21) Appl. No.: 12/010,683

(22) Filed: Jan. 29, 2008

(65) Prior Publication Data

US 2009/0143140 A1 Jun. 4, 2009

(30) Foreign Application Priority Data

Nov. 30, 2007 (JP) ................................. 2007-310902

(51) Int. Cl.
*A63F 13/00* (2006.01)

(52) U.S. Cl. ......... 463/37; 463/7; 463/8; 463/9; 463/31; 463/32; 463/33; 463/34; 463/35; 463/36; 273/148 B; 273/249; 273/444; 273/445

(58) Field of Classification Search ............ 463/16–20, 463/7–9, 31, 33–37, 42–43; 273/148 B, 273/249, 444, 445

See application file for complete search history.

(56) References Cited

U.S. PATENT DOCUMENTS

| | | | |
|---|---|---|---|
| 5,585,583 A * | 12/1996 | Owen .......................... | 84/470 R |
| 5,728,960 A | 3/1998 | Sitrick | |
| 6,084,168 A | 7/2000 | Sitrick | |
| 6,347,998 B1 * | 2/2002 | Yoshitomi et al. .............. | 463/42 |
| 6,554,711 B1 * | 4/2003 | Kawasaki et al. ............... | 463/43 |
| 6,908,386 B2 * | 6/2005 | Suzuki et al. ................... | 463/30 |
| 6,921,336 B1 * | 7/2005 | Best ............................... | 463/32 |
| 7,115,031 B2 * | 10/2006 | Miyamoto et al. ................ | 463/1 |
| 7,157,638 B1 | 1/2007 | Sitrick | |
| 7,297,856 B2 | 11/2007 | Sitrick | |
| 7,485,042 B2 * | 2/2009 | Nakatsuka et al. ............. | 463/42 |
| 7,625,284 B2 * | 12/2009 | Kay et al. ......................... | 463/31 |
| 7,699,704 B2 * | 4/2010 | Suzuki et al. ................... | 463/30 |
| 2007/0066394 A1 * | 3/2007 | Ikeda et al. ..................... | 463/37 |

OTHER PUBLICATIONS

User's Manual of Daigasso Band Brothers released on Dec. 2, 2004 from Nintendo Co., Ltd. (Partial Translation).

\* cited by examiner

*Primary Examiner* — Sunit Pandya
(74) *Attorney, Agent, or Firm* — Nixon & Vanderhye P.C.

(57) ABSTRACT

Provided is a game system executing a game by performing communication between a plurality of hand-held game apparatuses, each having a display section for displaying an image and an operation section, and a stationary game apparatus. In each of the plurality of hand-held game apparatuses, a plurality of directional signs indicative of operations performed by a player using the operation section is displayed on the display section. Operation data indicative of a content of the operation performed by using the operation section is transmitted to the stationary game apparatus. The stationary game apparatus receives the operation data transmitted from each of the plurality of hand-held game apparatuses. The stationary game apparatus obtains, from sound data storage means storing therein a plurality of pieces of sound data, sound data corresponding to the operation data, and at the same time, outputs a sound based on each piece of the obtained sound data.

22 Claims, 28 Drawing Sheets

F I G. 1
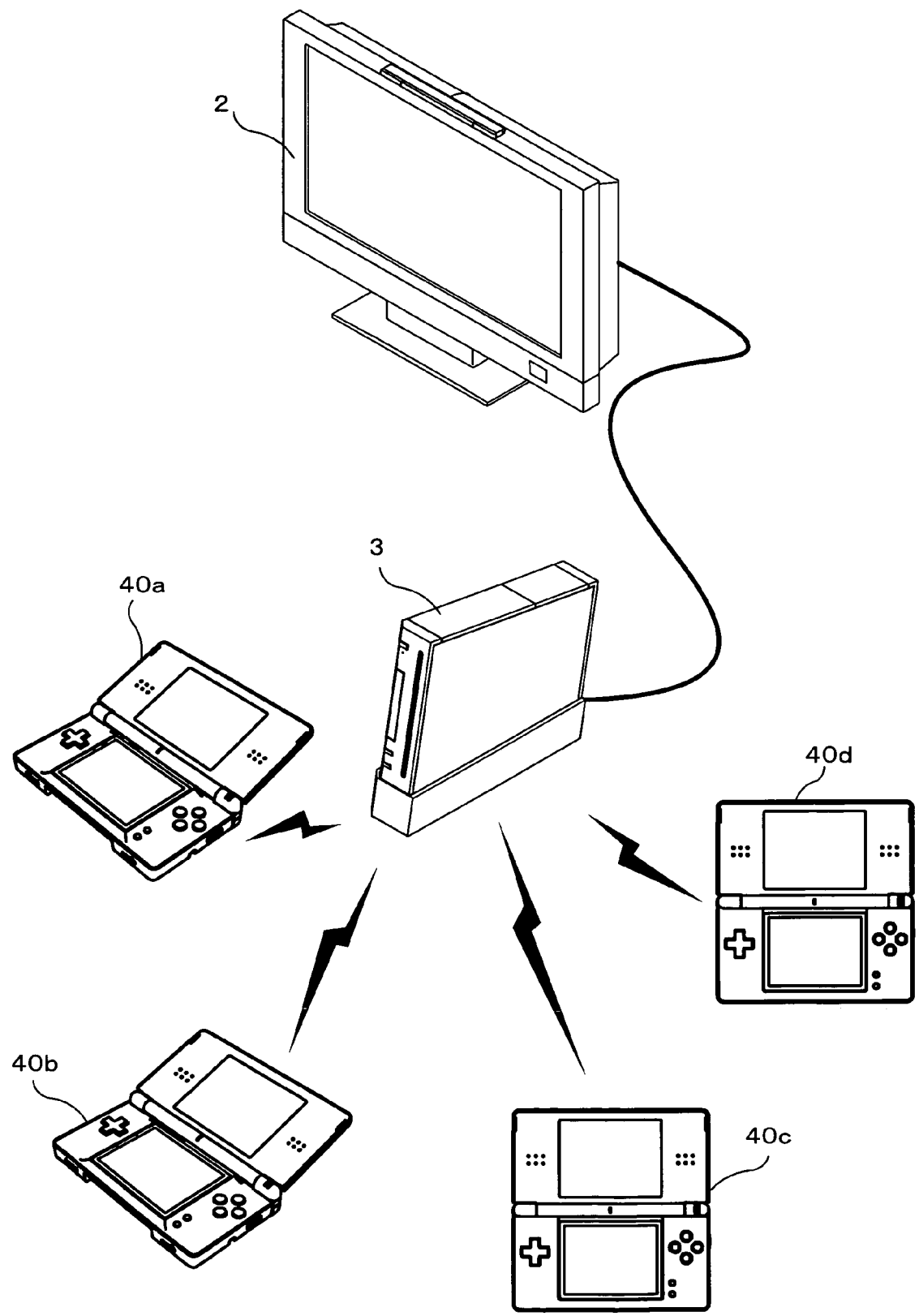

F I G. 4
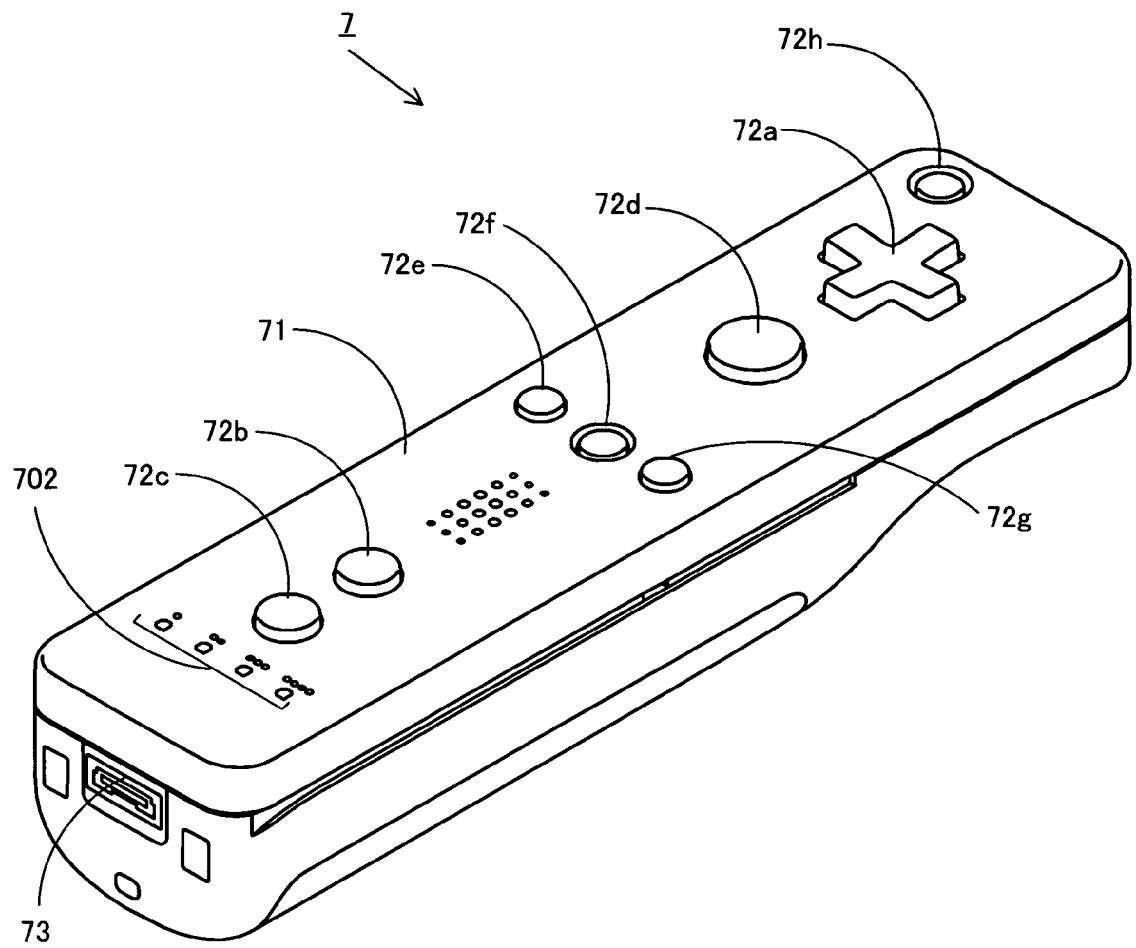
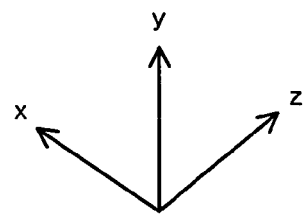

F I G. 8
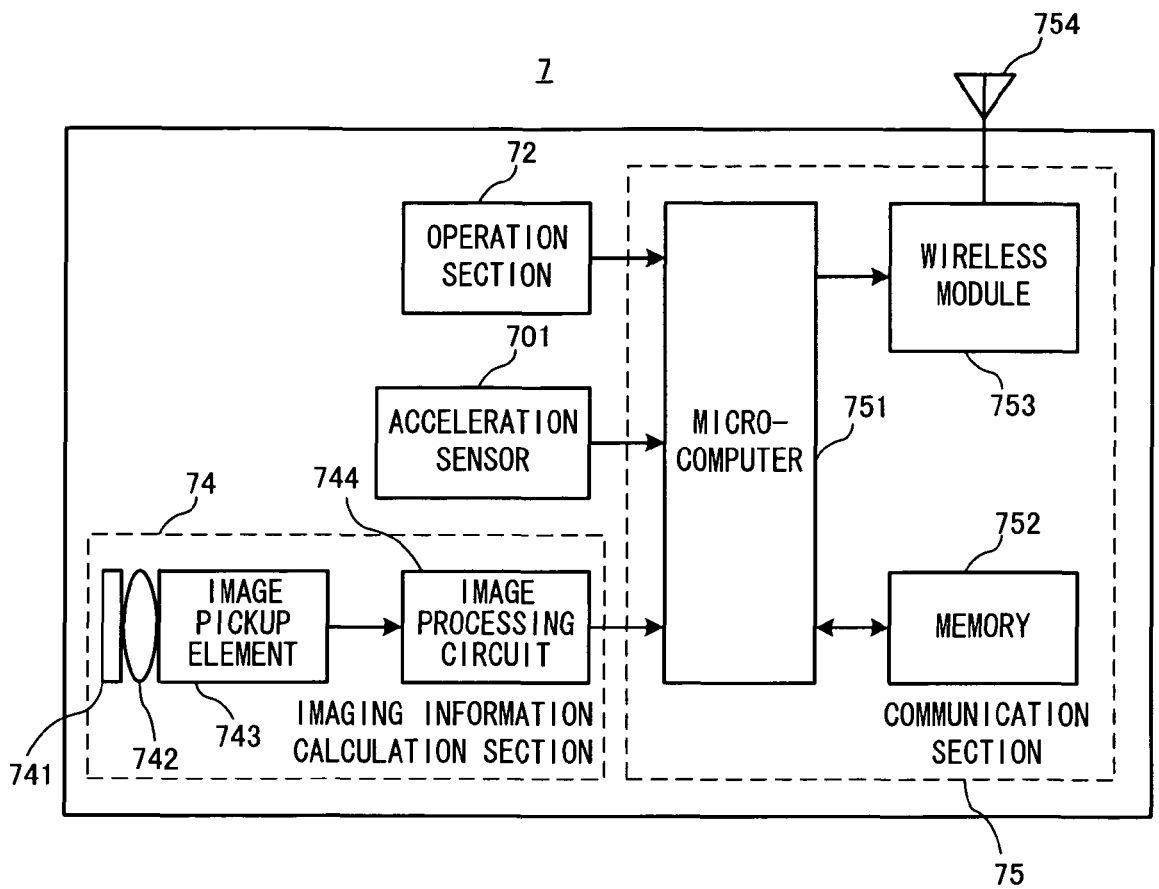

| 1661 | 1662 |
| --- | --- |
| TIME | TEMPO |
| 0 | 150 |
| 6 | 150 |
| 12 | 200 |
| ⋮ | ⋮ |

| 1671 | 1672 |
| --- | --- |
| TIME | PLAY PARAMETER |
| 0 | ... |
| 6 | ... |
| 12 | ... |
| ⋮ | ⋮ |

F I G. 3 3
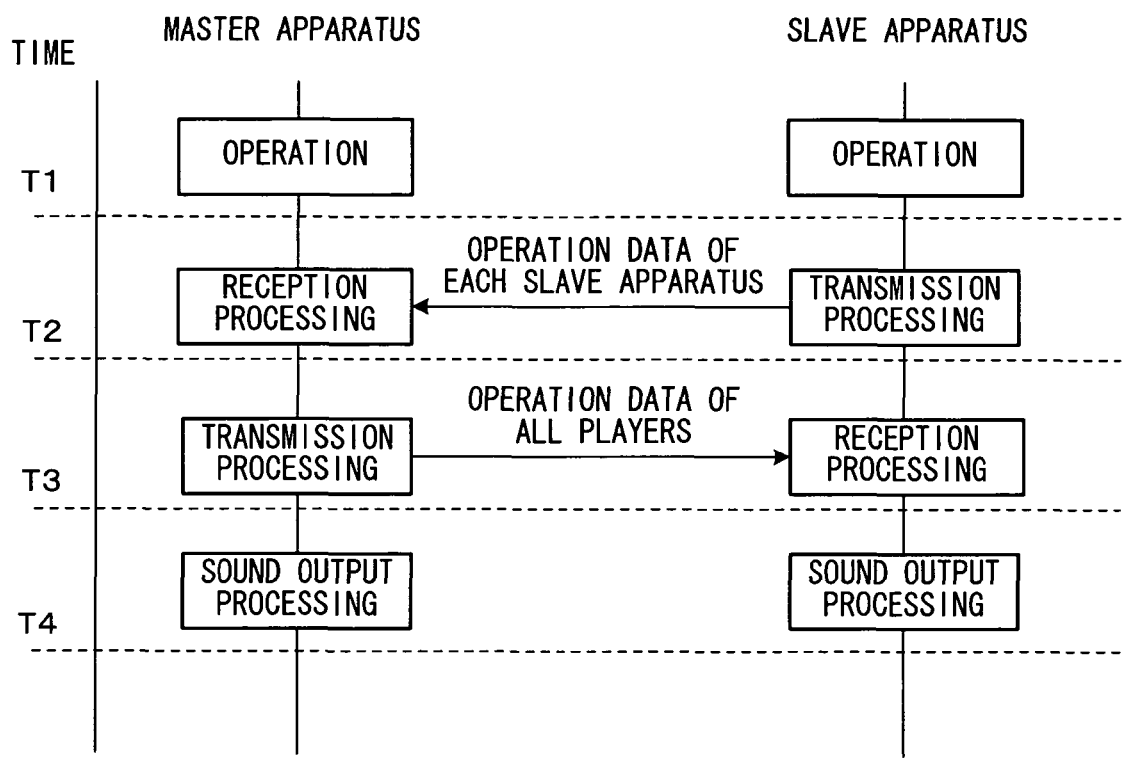

GAME SYSTEM

CROSS REFERENCE TO RELATED APPLICATION

The disclosure of Japanese Patent Application No. 2007-310902, filed on Nov. 30, 2007, is incorporated herein by reference.

FIELD

The technology described herein relates to a game system which executes a game process using communication between a stationary game apparatus and a plurality of hand-held game apparatuses. More specifically, the technology described herein relates to a music game system which causes a plurality of players to play cooperatively a musical composition.

BACKGROUND AND SUMMARY

Conventionally, a genre of games called a "music game", in which music is introduced as a game component, is widely known. In the games, a plurality of tracks, which are arranged vertically or horizontally, are displayed on a TV screen. In addition, an object moves on the tracks according to a music play. A player operates a predetermined operation switch in accordance with an operation timing indicated on the screen, whereby the player plays the game while an effect of causing the player to feel as if actually playing the music is exerted.

As one of the above-described music games, known is a music game which allows a plurality of players to participate in playing cooperatively one musical composition (e.g., User's Manual of "Daigasso Band Brothers" released on Dec. 2, 2004 from Nintendo Co., Ltd.). In this cooperative music playing game, the music is played by using a plurality of hand-held game apparatuses each having a wireless communication function incorporated therein. FIG. 32 is a diagram showing a system configuration when the cooperative music playing game is played. In the cooperative music playing game, one of the plurality of hand-held game apparatuses is regarded as a master apparatus 401a. The remaining hand-held game apparatuses are regarded as slave apparatuses 401b, and communication lines are established such that each of the slave apparatuses 401b can perform wireless communication with the master apparatus 401a.

Further, in the cooperative music playing game, one musical composition is divided into respective units called "parts" (for example, parts of the guitar, the piano, the violin, and the like) depending on the musical instruments used for playing the musical composition. One player has one of the hand-held game apparatuses. The above-described "parts" are assigned to respective players. An operation screen displayed on each of hand-held game apparatuses varies in accordance with the part to be performed, and thus each of the players performs operation for playing the part (e.g., pressing buttons or the like in accordance with an operation timing displayed on the screen of each of the players). That is, each of the players imaginarily plays a different musical instrument. In the case of being exemplified by the above-described example, one player plays the guitar, one player plays the piano, and the other one player plays the violin, imaginarily.

Operation data of each of the players is gathered to the master apparatus, and the gathered operation data is transmitted to each of the slave apparatuses. Accordingly, the operation data performed by each of the players is distributed to each of the hand-held game apparatuses. In each of the hand-held game apparatuses (both of the master apparatus and the slave apparatuses), a sound of each of the parts is simultaneously outputted in accordance with the distributed operation data, whereby sounds (of the guitar, the piano, and the violin in the case of the above-described example) caused by the operation of the each of the player can be outputted. In this manner, the cooperative music playing game provides the plurality of players with fun of experiencing in playing one musical composition cooperatively.

However, the above-described cooperative music playing game has the following problems. FIG. 33 is a diagram schematically showing a processing flow during the cooperative music playing performed with the conventional cooperative music playing game. As shown in FIG. 33, the respective players play respective operations (time T1). Next, in each of the slave apparatuses 401b, processing to transmit the operation data to the master apparatus 401a is performed, and in the master apparatus 401a, processing to receive the operation data (time T2) is performed. Accordingly, the operation data of each of the players are gathered to the master apparatus 401a.

Next, processing is performed so as to transmit the gathered operation data from the master apparatus 401a to each of the slave apparatuses 401b. In accordance with this, in each of the slave apparatuses 401b, processing is performed so as to receive the operation data of each of the players transmitted from the master apparatus 401a (time T3). Processing is then performed so as to output, from each of the hand-held game apparatuses, a sound having reflected therein the operation data of each of the players (time T4).

As shown in the above-described processing flow, in order to output the sound from each of the slave apparatuses 401b after the operation is performed therewith, each of the slave apparatus 401b needs to receive the operation data of the other players via the master apparatus 401a. In other words, even if each of the players performs the operation, the sounds having reflected therein the operations of all the players cannot be outputted immediately thereafter. In the case of FIG. 33, three processing steps corresponding to times T2, T3 and T4 are necessary after the operation performed by each of the players until the output of the sounds. Further, the game process is generally processed in units of frames, e.g., at an interval of 1/60 of a second, which is an interval of drawing a game screen. However, due to a communication speed of the wireless communication, it is difficult to perform transmission from the slave apparatus to the master apparatus (processing during time T2) and transmission from the master apparatus to the slave apparatus (processing during time T3) within one frame. Generally, processing time of a two-frame length, that is, one frame for the processing during time T2 and one frame for the processing during time T3, is required. As a result, in the conventional cooperative music playing games, there has been a time lag of one-frame length between the operation performed by each of the players and an actual output of the sounds caused by the operation performed by each of the players. Therefore, a problem has been posed in that, depending the content (such as tempo) of a musical composition played cooperatively, the player may feel a sense of discomfort resulting from the time lag.

In the case of the above-described hand-held game apparatus, a main body (housing) thereof needs to be downsized for the sake of being carried by the player. In order to downsize the main body, a speaker mounted therein needs to be downsized inevitably. However, a small speaker generally has weak bass output, and thus a problem is posed in that an outputted sound cannot have a sound quality which satisfies the player.

Further, a processing unit such as a CPU used for the hand-held game apparatus is generally slow in processing speed as compared to that of a stationary game apparatus. On the other hand, with respect to sound data, the higher the sound quality is, the greater an amount of the data becomes. However, it may be an excessive processing load for the CPU of the hand-held game apparatus, which is relatively slow in the processing speed, to process the sound data of a large data amount (high quality sound data). Therefore, in order to keep providing the player with a preferable operational feeling, there has been adopted "small-amount" sound data, in which the sound quality is degraded to some degree, for processing. As a result, in addition to the problem of the above-described size of the speaker, a problem has been posed in that quality of the sound outputted from the hand-held game apparatus is low, since the quality of the sound data processed by the hand-held game apparatus is originally low.

Therefore, certain example embodiments provide a game system which eliminates time lag between an operation of each of the players and outputting of the sound, when a plurality of players plays a game of outputting a sound by using respective hand-held game apparatuses.

Further, certain example embodiments provide a game system which is capable of causing a plurality of players to enjoy high quality sound output by using respective hand-held game apparatuses.

Certain example embodiments may have the following features described herein. The reference numerals, additional explanations and the like in the parentheses indicate the correspondence with the embodiment described below in order to aid in understanding of the described embodiments and are not intended to be limiting in any way.

A first aspect is a game system executing a game by performing communication between a stationary game apparatus (3) and a plurality of hand-held game apparatuses (40), each including a display section (41, 42) for displaying an image and an operation section (44, 45). Each of the plurality of hand-held game apparatuses comprises display control means (51) and operation data transmission means (63). The display control means causes a plurality of directional signs to be displayed on the display section so as to indicate to a player an operation to be performed by using the operation section. The operation data transmission means transmits, to the stationary game apparatus, operation data indicative of a content of the operation performed by using the operation section. The stationary game apparatus comprises sound data storage means for the stationary apparatus (12), operation data reception means (18), sound reading means (10), and sound output means (10, 15, 16). The sound data storage means for the stationary apparatus stores therein a plurality of pieces of sound data. The operation data reception means receives the operation data transmitted from each of the plurality of hand-held game apparatuses. The sound reading means obtains, from the sound data storage means, sound data corresponding to the operation data transmitted from each of the plurality of the hand-held game apparatuses. The sound output means outputs a sound based on the obtained sound data.

According to the first aspect, it is possible to reduce a time lag between the operation of the player and the output of the sound corresponding to the operation. Further, it is possible to cause the player to enjoy a game while a high quality sound is outputted.

In a second aspect based on the first aspect, a game executed by the game system is a music game in which a musical composition which is composed of a plurality of parts is played cooperatively by using each of the hand-held game apparatuses while each of the plurality of parts are taken charge of by each of the hand-held game apparatuses. The plurality of directional signs indicates a content of a play operation of the musical composition with respect to each of the plurality of parts. Each of the hand-held game apparatuses further comprises directional sign storage means (54) for storing, in a chronological order, therein, data indicative of the plurality of directional signs. The display control means reads, from the directional sign storage means, the plurality of directional signs for causing each of the hand-held game apparatuses to play the part taken charge of thereby, and displays the plurality of directional signs on the display section. The sound data storage means for the stationary apparatus stores therein sound data corresponding to each of the plurality of parts. The sound data reading means reads, in accordance with the operation data, sound data corresponding to a part taken charge of by a hand-held game apparatus, which is a transmission source of the operation data.

According to the second aspect, by using a high quality sound, it is possible to cause the player to enjoy the cooperative play without feeling discomfort such as a time lag in the sound. Accordingly, the plurality of players can strongly feel togetherness through the cooperative music playing, and accordingly amusingness of the music game can be improved.

In a third aspect based on the second aspect, each of the hand-held game apparatuses further comprises: part selection means (51) for causing a player to select a part to be taken charge of by the player; and part information transmission means (63) for transmitting part selection information indicative of the part selected by the player to the stationary game apparatus. The stationary game apparatus further comprises: part information reception means (10, 18) for receiving the part selection information; and all part information transmission means (10, 18) for transmitting all pieces of the received part selection information to each of the hand-held game apparatuses.

According to the third aspect, the respective parts composing the musical composition is assigned to the plurality of players, whereby it is possible to cause the players to enjoy playing the musical composition.

In a fourth aspect based on the third aspect, the stationary game apparatus further comprises automatic playing means (10) for reproducing a part of the musical composition, among the plurality of parts constituting the musical composition, which is not selected by the part selection means.

According to the fourth aspect, even when a small number of players enter the cooperative music playing game, it is possible to cause the player to enjoy as if the musical composition is played by a larger number of players.

In a fifth aspect based on a first aspect, the sound output means is capable of outputting the sound data obtained by the sound reading means by changing the musical scale of the sound data to a predetermined musical scale.

According to the fifth aspect, it is possible to reduce an amount of data to be stored in the sound data storage means for the stationary apparatus.

In a sixth aspect based on the first aspect, the operation section includes a depressible key. The operation data includes data indicative of an operation of the depressible key.

According to the sixth aspect, it is possible to cause the player to enjoy the music game by using a simple operation of merely pressing buttons.

In a seventh aspect based on the first aspect, the operation section includes a touch panel. The operation data includes data indicative of a touch coordinate point on the touch panel.

According to the seventh aspect, it is possible to widen a type of an operation method by introducing the touch panel operation.

In an eighth aspect based on the second aspect, each of the hand-held game apparatuses further comprises sound data storage means (54), inter-hand-held-apparatus communication means (63), inter-hand-held-apparatus communication game means (51), and game mode selection means (51). The sound data storage means for the hand-held apparatus stores therein sound data whose quality is lower than the sound data stored in the sound data storage means for the stationary apparatus. The inter-hand-held-apparatus communication means performs communication among the hand-held game apparatuses. The inter-hand-held-apparatus communication game means performs the music game while communication among the hand-held game apparatuses is performed by using the sound data stored in the sound data storage means for the hand-held apparatus and the inter-hand-held-apparatus communication means. The game mode selection means causes the player to select either of a game mode in which the music game is performed while communication is performed among the hand-held game apparatuses or a game mode in which the music game is performed through communication with the stationary game apparatus.

According to the eighth aspect, a game mode can be selected from either of that using the stationary game apparatus or that not using the stationary game apparatus, and thus it is possible to widen the manner in which the player enjoys the game. Further, in the case where the stationary game apparatus is used, the player can enjoy the music game of a high sound quality, which encourages the player to use the stationary game apparatus.

In a ninth aspect based on the second aspect, at least one of the hand-held game apparatuses further includes musical composition data storage means (54) and musical composition data transmission means (63). The musical composition data storage means includes data indicative of the plurality of directional signs. The musical composition data transmission means transmits the musical composition data to the stationary game apparatus. The stationary game apparatus further comprises musical composition data reception means (10, 18) and musical composition data distribution means (10, 18). The musical composition data reception means receives the musical composition data. The musical composition data distribution means transmits the received musical composition data to the hand-held game apparatuses. The directional sign storage means stores therein data indicative of the plurality of directional signs included in the musical composition data transmitted from the musical composition data distribution means.

According to the ninth aspect, as long as data of a musical composition is stored in one of the plurality of hand-held game apparatuses, many players can enjoy playing the musical composition.

In a tenth aspect based on the ninth aspect, each of the plurality of the hand-held game apparatuses further comprises scoring point calculation means (51) and scoring point transmission means (63). The scoring point calculation means calculates a scoring point of a play operation performed by the player by comparing the musical composition data to the operation data. The scoring point transmission means transmits scoring point data indicative of the scoring point to the stationary game apparatus. The stationary game apparatus further comprises scoring point reception means (18) and scoring point display means (10). The scoring point reception means receives the scoring point data transmitted by the scoring point transmission means. The scoring point display means displays the scoring point of the player of each of the hand-held apparatuses in accordance with the received scoring point data.

According to the tenth aspect, an accurate scoring point calculation can be performed. Since the player can recognize scoring points of other players, it is possible to enhance the amusingness of the game.

In an eleventh aspect based on the ninth aspect, the stationary game apparatus further comprises distribution program storage means (17) and distribution means (18). The distribution program storage means stores therein a play operation program for allowing a play operation to be performed by using each of the hand-held game apparatuses. The distribution means distributes the play operation program. Each of the hand-held game apparatuses further comprises storage medium receiving means (53) and play operation program storage means (54). The storage medium receiving means detachably accommodates a storage medium (47) having stored therein a game program for executing the music game and the musical composition data. The play operation program storage means stores therein the play operation program. The musical composition data transmission means of a hand-held game apparatus, which accommodates the storage medium, transmits the musical composition data stored in the storage medium to the stationary game apparatus. The distribution means transmits the play operation program to a hand-held game apparatus which does not accommodate the storage medium. The musical composition data distribution means transmits, to the hand-held game apparatus which does not accommodate the storage medium, the musical composition data transmitted from the musical composition data transmission means of the hand-held game apparatus which accommodates the storage medium. The hand-held game apparatus, which does not accommodate the storage medium, executes the music game in accordance with the play operation program transmitted from the distribution means and the musical composition data transmitted from the musical composition data distribution means.

According to the eleventh aspect, the storage medium having stored therein the game program and the musical composition data is not necessarily mounted in all the hand-held game apparatuses, and only with one storage medium, a plurality of players can enjoy the music game.

According to certain example embodiments, a time lag between the operation of the player and the actual sound output can be decreased. Accordingly, it is possible to provide the player with a comfortable sense of playing without causing the player to feel the time lag in the sound output.

These and other objects, features, aspects, and advantages of certain example embodiments will become more apparent from the following detailed description when taken in conjunction with the accompanying drawings.

BRIEF DESCRIPTION OF THE DRAWINGS

FIG. 1 is an external view illustrating a whole game system according to one embodiment;

FIG. 4 is a perspective view of a controller 7 as viewed from a top rear side thereof shown in FIG. 1;

FIG. 8 is a block diagram showing a configuration of the controller 7 shown in FIG. 3;

FIG. 22 is a diagram showing an exemplary data structure of a tempo list 166;

FIG. 23 is a diagram showing an exemplary data structure of a parameter list 167;

FIG. 33 is a diagram schematically showing a processing flow during cooperative playing with the conventional music playing game.

DETAILED DESCRIPTION

Hereinafter, an embodiment will be described with reference to diagrams. Note that this embodiment does not limit the scope of the present invention in any way.

As shown in FIG. 1, a game system of the present embodiment is composed of one stationary game apparatus (hereinafter simply referred to as a stationary apparatus) 3 and a plurality of hand-held game apparatuses 40 (hereinafter simply referred to as hand-held apparatuses). The stationary apparatus 3 and each of the hand-held apparatuses 40 are connected to each other so as to wirelessly communicate with each other. A television receiver (hereinafter simply referred to as a "television") 2 is also connected to the stationary apparatus 3.

Figure 2:
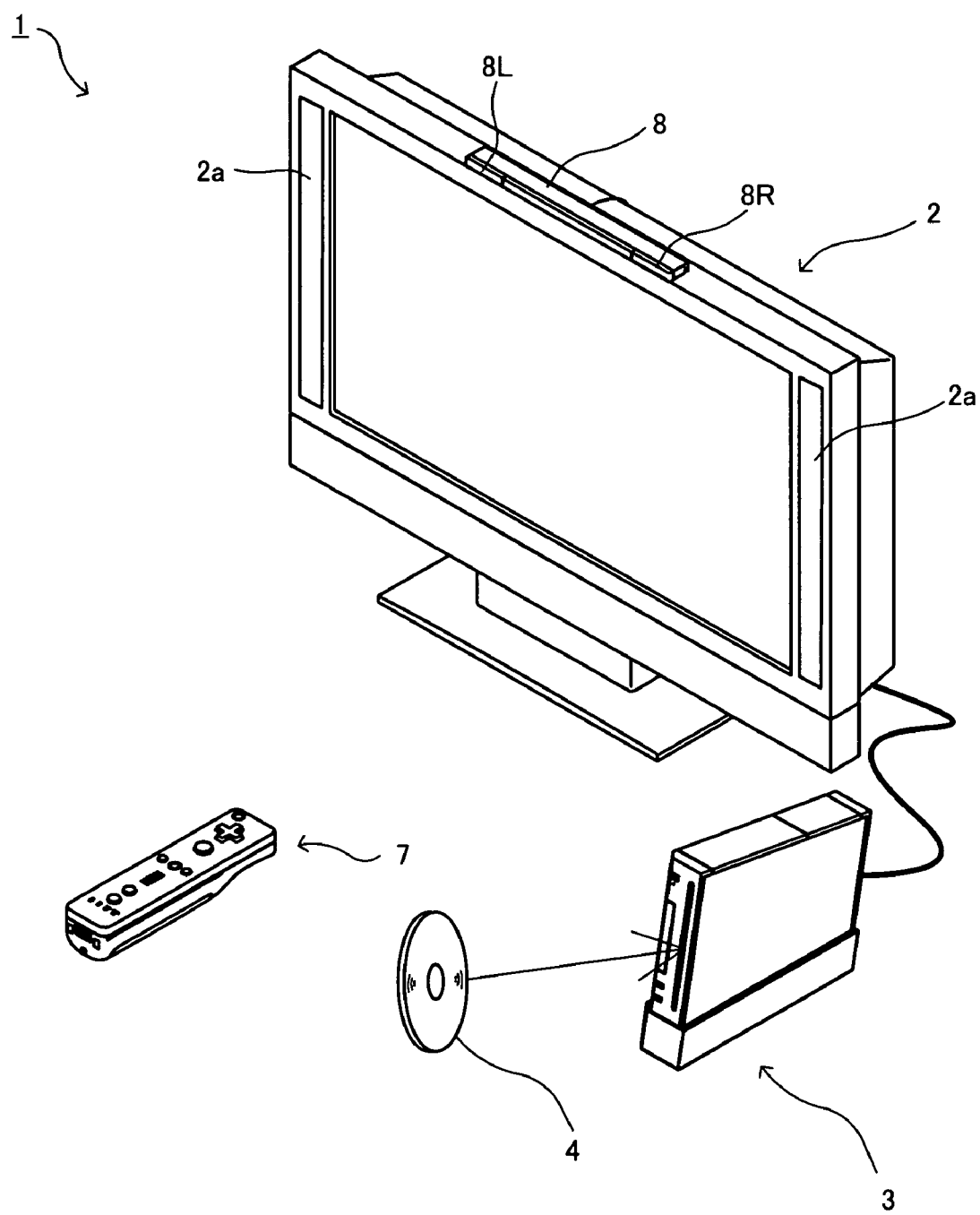
FIG. 2 is an external view illustrating a stationary game apparatus 3 shown in FIG. 1.

FIG. 2 is an external view of the stationary apparatus 3. As shown in FIG. 2, the stationary apparatus 3 includes an optical disc 4, a controller 7, and a marker section 8. The present game system causes the stationary apparatus 3 to execute a game process in accordance with a game operation using the controller 7.

The optical disc 4, which is an exemplary information storage medium and exchangeably used to the stationary apparatus 3, is detachably inserted into the stationary apparatus 3. The optical disc 4 has stored therein a game program to be executed on the stationary apparatus 3. On the front surface of the stationary apparatus 3, an insertion slot of the optical disc 4 is provided. In the stationary apparatus 3, the game program stored in the optical disc 4 having been inserted in the insertion slot is read and executed, whereby a game process is executed.

The television 2, which is an exemplary display apparatus, is connected to the stationary apparatus 3 via a connection cord. On the television 2, a game image, which is obtained as a result of the game process executed on the stationary apparatus 3, is displayed. At a peripheral part of a screen of the television 2 (an upper side of the screen in the case of FIG. 1), the marker section 8 is provided. The marker section 8 has two markers 8R and 8L located at both ends thereof. The marker 8R (as well as the marker 8L) is specifically composed of one or more infrared LEDs, and outputs infrared light forward from the television 2. The marker section 8 is connected to the stationary apparatus 3, and the stationary apparatus 3 is capable of controlling lighting of the respective infrared LEDs in the marker section 8.

The controller 7 is an input device for providing the stationary apparatus 3 with operation data indicative of a content of an operation applied to the controller 7. The controller 7 and the stationary apparatus 3 are connected to each other through wireless communication. In the present embodiment, a technique of Bluetooth (registered trademark), for example, is used for the wireless communication between the controller 7 and the stationary apparatus 3. In another embodiment, the controller 7 and the stationary apparatus 3 may be connected to each other via a fixed line.

(Internal Configuration of Stationary Apparatus 3)

Figure 3:
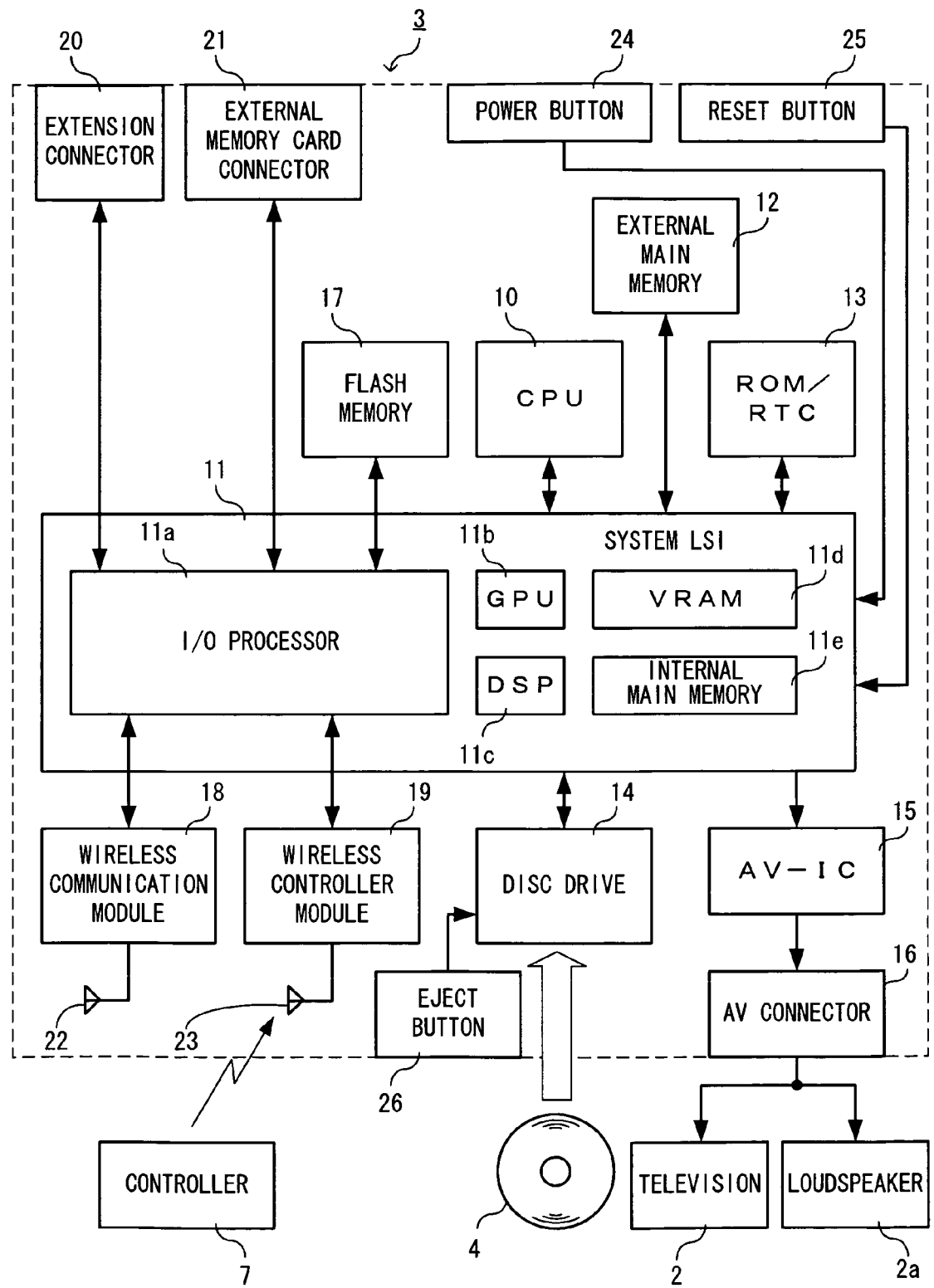
FIG. 3 is a functional block diagram of a stationary game apparatus 3 shown in FIG. 1.

Next, with reference to FIG. 3, an internal configuration of the stationary apparatus 3 will be described. FIG. 3 is a block diagram showing a configuration of the stationary apparatus 3. The stationary apparatus 3 includes a CPU 10, a system LSI 11, an external main memory 12, a ROM/RTC 13, a disc drive 14, an AV-IC 15, and the like.

The CPU 10 executes the game process by causing the game program stored in the optical disc 4 to be executed, and functions as a game processor. The CPU 10 is connected to the system LSI 11. To the system LSI 11, in addition to the CPU 10, the external main memory 12, the ROM/RTC 13, the disc drive 14, and the AV-IC 15 are connected. The system LSI 11 performs processing such as control of data transmission among respective component parts connected thereto, generation of an image to be displayed, and acquisition of data from an external apparatus. An internal configuration of the system LSI will be described later. The external main memory 12, which is of a volatile type, stores programs such as a game program read from the optical disc 4 or from a flash memory, and other various data. The external main memory 12 is used as a work area and a buffer space for the CPU 10. The ROM/RTC 13 includes a ROM (so-called a boot ROM) incorporating a program for starting up the game apparatus 3, and a clock circuit (RTC: Real Time Clock) for counting time. The disc drive 14 reads program data, texture data and the like from the optical disc 4, and writes the read data into an internal main memory 11e, which is described later, or into the external main memory 12.

Further, provided to the system LSI 11 are an input/output (I/O) processor 11a, a GPU (Graphics Processor Unit) 11b, a DSP (Digital Signal Processor) 11c, a VRAM 11d, and the internal main memory 11e. These component parts 11a, 11b, 11c, 11d, and 11e are, though not shown in diagrams, connected to one another via an internal bus.

The GPU 11b functions as a part of drawing means, and generates an image in accordance with a graphics command (draw command) from the CPU 10. More specifically, the GPU 11b generates game image data by performing, in accordance with the graphics command, calculation processing, which is necessary to display 3D graphics, such as coordinate conversion from 3D coordinates to 2D coordinates, which corresponds to processing before rendering, and final rendering processing including texture pasting and the like. Here, in addition to the graphics command, the CPU 10 provides an image generation program, which is necessary to generate the game image data, to the GPU 11b. The VRAM 11d stores data (such as polygon data and texture data) necessary for the GPU 11b to execute the graphics command. For generating an image, the GPU 11b uses the data stored in the VRAM 11d, thereby generating the image data.

The DSP 11c functions as an audio processor, and generates audio data by using sound data and sound waveform (tone quality) data stored in the internal main memory 11e and the external main memory 12. Further, as with the external main memory 12, the internal main memory 11e may be used to store programs and various data, or may be used as the work area or the buffer space for the CPU 10.

The image data and the audio data generated as above described are read by the AV-IC 15. The AV-IC 15 outputs the read image data to the television 2 via an AV connector 16, and also outputs the read audio data to loudspeakers 2a embedded in the television 2. Accordingly, the image is displayed on the television 2, and the sound is outputted from the loudspeakers 2a.

The I/O processor 11a executes data transmission with component parts connected thereto and also executes data downloading from an external apparatus. The I/O processor 11a is connected to the flash memory 17, a wireless communication module 18, a wireless controller module 19, an extension connector 20, and an external memory card connector 21. An antenna 22 is connected to the wireless communication module 18, and an antenna 23 is connected to the wireless controller module 19.

The I/O processor 11a is connected to a network via the wireless communication module 18 and the antenna 22, and is capable of communicating with another game apparatus and various servers connected to the network. The I/O processor 11a accesses the flash memory 17 at regular intervals so as to detect data, if any, which is necessary to be transmitted to the network. If the data is detected, the detected data is transmitted to the network via the wireless communication module 18 and the antenna 22. Further, the I/O processor 11a receives data transmitted from the other game apparatuses, and data and a game program downloaded from a download server via the network, the antenna 22 and the wireless communication module 18, and stores the received data and the game program in the flash memory 17. The CPU 10 executes the game program stored in the flash memory 17 or the optical disc 4, reads the data stored in the flash memory 17, and causes the game program to use the read data. In the flash memory 17, not only data transmitted between the stationary apparatus 3 and the other game apparatuses or various servers, but also saved data of a game (result data or midstream data of the game) played by using the stationary apparatus 3 may be stored.

Further, the I/O processor 11a receives the operation data, which is transmitted from the controller 7, via the antenna 23 and the wireless controller module 19, and (temporarily) stores the operation data in the internal main memory 11e or in the buffer space of the external main memory 12.

Further, the extension connector 20 and the external memory card connector 21 are connected to the I/O processor 11a. The extension connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The external memory card connector 21 is a connector for connecting thereto the external storage medium such as a memory card. For example, the I/O processor 11a accesses the external storage medium via the extension connector 20 or the external memory card connector 21, and then saves data or reads data.

Provided to the stationary apparatus 3 are a power button 24, a reset button 25, an eject button 26. The power button 24 and the reset button 25 are connected to the system LSI 11. When the power button 24 is turned on, the power is supplied to the respective component parts of the stationary apparatus 3 via an AC adapter which is not shown. Further, when the power button 24 is pressed again while the power is on, the state of the stationary apparatus 3 shifts to a low-power standby mode. Since the power is supplied to the stationary apparatus 3 even in such a state, the stationary apparatus 3 can be constantly connected to the network such as the Internet. In the case of turning off the power after the power is turned on, the power can be turned off by holding the power button 24 down for a predetermined time period or longer. When the reset button 25 is pressed, the system LSI 11 reactivates a start-up program of the stationary apparatus 3. The eject button 26 is connected to the disc drive 14. When the eject button 26 is pressed, the optical disc 4 is ejected from the disc drive 14.

Next, with reference to FIGS. 3 and 4, the controller 7 will be described. FIG. 3 is a perspective view of the controller 7 as viewed from a top rear side thereof. FIG. 4 is a perspective view of the controller 7 as viewed from a button front side thereof.

As shown in FIGS. 3 and 4, the controller 7 includes a housing 71, and an operation section 72 composed of a plurality of operation buttons provided on the surface of the housing 71. The housing 71 of the present embodiment has a substantially parallelepiped shape extending in a longitudinal direction from front to rear, and an overall size thereof is small enough to be held by one hand of an adult or even a child. The housing is formed by, for example, plastic molding.

At a front center portion of a top surface of the housing 71, a cross key 72a is provided. The cross key 72a is a cross-shaped four-direction push switch, and the operation portions thereof are respectively located on cross-shaped projecting portions arranged at intervals of 90 degrees such that the operation portions correspond to four directions (front, rear, right and left). A player selects one of the front, rear, right, and left directions by pressing one of the operation portions of the cross key 72a. Through an operation of the cross key 72a, the player can, for example, indicate a direction in which a player character or the like appearing in a virtual game world is to move, or select an instruction from a plurality of choices.

The cross key 72a is an operation section for outputting an operation signal in accordance with the direction input operation performed by the player as above described, and such an operation section may be provided in another form. For example, the operation section may be such that four push switches are arranged in the cross directions and an operation signal is outputted by the player's pressing one of the four push switches. Further, in addition to the four push switches, a center switch may be provided at a crossing position of the above-described cross directions so as to provide an operation section composed of the four push switches and the center switch. Alternatively, the cross key 72a may be replaced with an operation section which includes an inclinable stick (so called a joystick) projecting from the top surface of the housing 71 and which outputs the operation signal in accordance with an inclining direction of the stick. Still alternatively, the cross key 72a may be replaced with an operation section which includes a disc-shaped member horizontally slidable and which outputs an operation signal in accordance with an sliding direction of the disc-shaped member. Still alternatively, the cross key 72a may be replaced with a touchpad.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are each an operation section for outputting an operation signal assigned thereto when the player presses a head thereof. For example, functions such as a NO. 1 button, a NO. 2 button, an A button and the like are assigned to the operation buttons 72b, 72c and 72d. Further, functions such as a minus button, a home button, a plus button and the like are assigned to the operation buttons 72e, 72f and 72g. Various operation functions are assigned to these operation buttons 72a, 72b, 72c, 72d, 72e, 72f and 72g in accordance with the game program executed by the stationary apparatus 3. In an exemplary arrangement shown in FIG. 3, the operation buttons 72b, 72c and 72d are arranged in a line at the center in a front-rear direction on the top surface of the housing 71. Further, the operation buttons 72e, 72f and 72g are arranged in a line on the top surface of the housing 71 in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the stationary apparatus 3 by remote control. The operation button 72h also has a top surface thereof buried in the top surface of the housing 71, so as not to be inadvertently pressed by the player.

Behind the operation button 72c on the top surface of the housing 71, a plurality of LEDs 702 is provided. A controller type (number) is assigned to the controller 7 such that the controller 7 is distinguishable from anther controller 7. Here, the LEDs 702 are used for, for example, informing the player about the controller type currently set for the controller 7. Specifically, when the controller 7 transmits transmission data to the game apparatus 3, one of the plurality of LEDs 702 which corresponds to the controller type of the controller 7 is lit up.

On the top surface of the housing 71, loudspeaker holes for emitting a sound from a loudspeaker (a loudspeaker 706 shown in FIG. 6), which is described later, are formed between the operation button 72b and the operation buttons 72e, 72f and 72g.

On a bottom surface of the housing 71, a recessed portion is formed. As described later in detail, the recessed portion on the bottom surface of the housing 71 is formed in a position in which an index finger or middle finger of the player is located when the player holds the controller 7 with one hand and points a front portion thereof to the markers 8L and 8R. On a slope surface of the recessed portion, an operation button 72i is provided. The operation button 72i is an operation section acting as, for example, a B button.

On a front surface of the housing 71, an image pickup element 743 constituting a part of an imaging information calculation section 74 is provided. The imaging information calculation section 74 is a system which analyzes image data picked up by the controller 7, identifies an area having a high brightness in the image, and detects a position of a gravity center, a size and the like of the area. The imaging information calculation section 74 has, for example, a maximum sampling period of about 200 frames/sec., and thus can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for coupling and connecting the controller with a connection cable.

For the sake of a specific description, a coordinate system set for the controller 7 will be defined. As shown in FIGS. 3 and 4, an x-axis, a y-axis and z-axis respectively running at right angles to one another are defined with respect to the controller 7. Specifically, the z-axis represents a longitudinal direction of the housing 71, which corresponds to the front-rear direction of the controller 7, and direction on the side of the front surface (a surface on which the imaging information calculation section 74 is provided) of the controller 7 is set as a z-axis positive direction. Further, the y-axis represents an up-down direction of the controller 7, and direction on the side of the top surface of the housing 71 (a surface on which the operation button 72a is provided) is set as a y-axis positive direction. Still further, the x-axis represents the left-right direction of the controller 7, and a direction on the left side (a side which is not shown in FIG. 3, but shown in FIG. 4) of the housing 71 is set as an x-axis positive direction.

Figure 5:
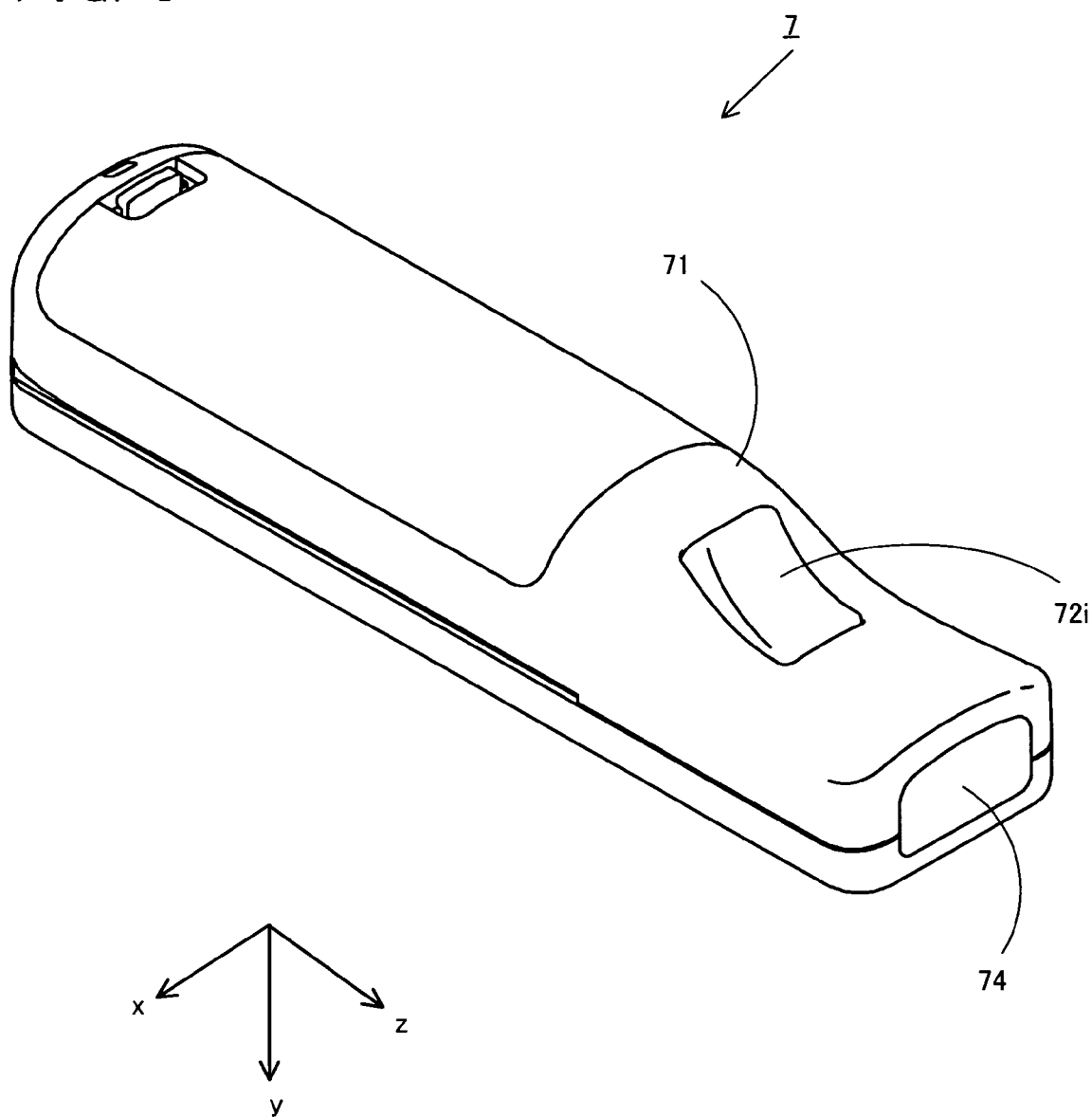
FIG. 5 is a perspective view of the controller 7 as viewed from a bottom front side thereof shown in FIG. 3.
Figure 6:
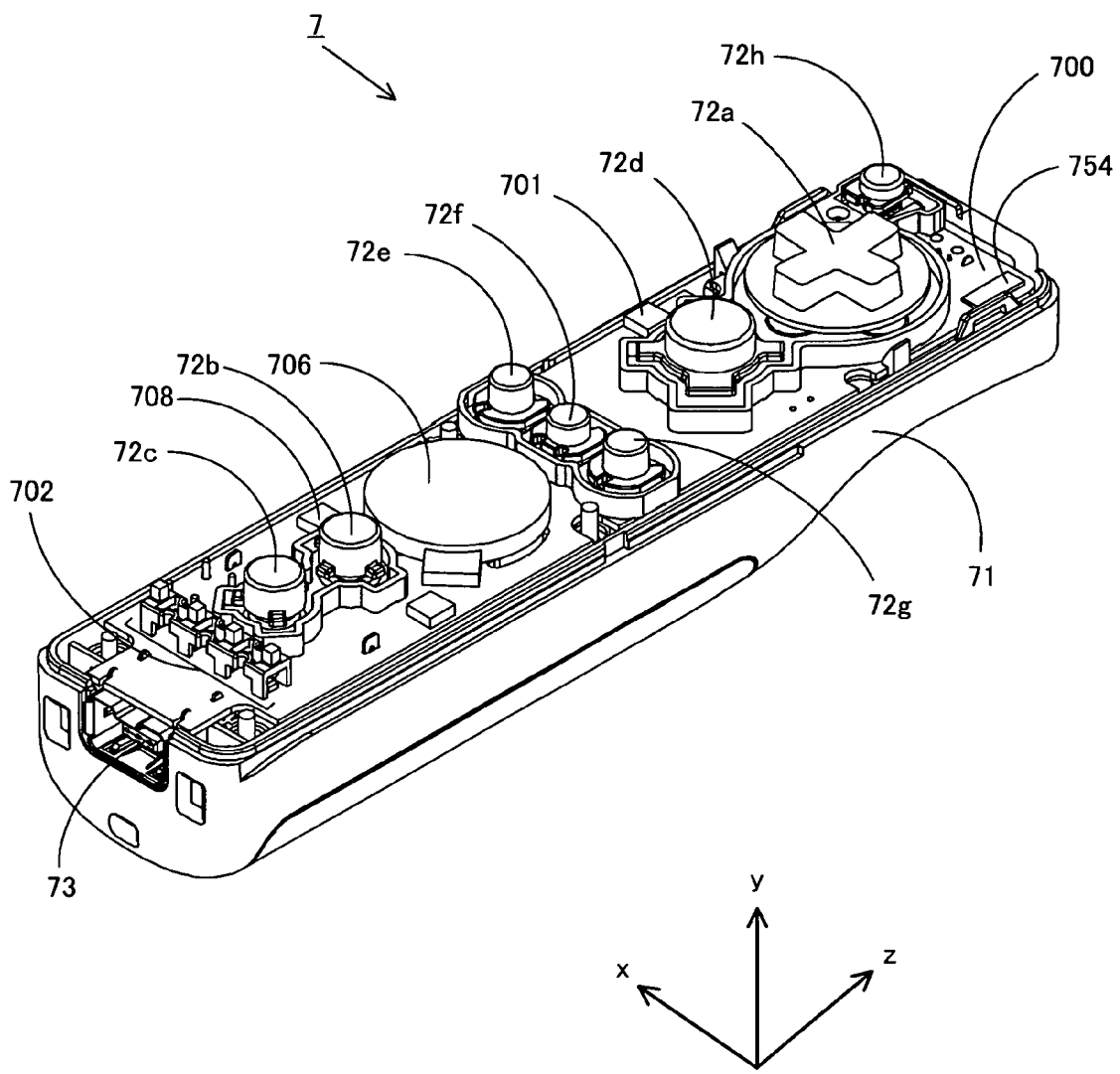
FIG. 6 is a perspective view of the controller 7 shown in FIG. 3 in a state where an upper housing thereof is removed.

With reference to FIGS. 5 and 6, an internal structure of the controller 7 will be described. FIG. 5 is a perspective view of the controller 7 in a state where an upper housing (a part of the housing 71) of the controller 7 is removed. FIG. 6 is a perspective view of the controller 7 in a state where a lower housing (a part of the housing 71) is removed. FIG. 6 is a perspective view of a substrate 700 as viewed from a reverse side of the substrate 700 shown in FIG. 5.

As shown in FIG. 5, the substrate 700 is fixed inside the housing 71. Provided on a top main surface of the substrate 700 are the operation buttons 72a, 72b, 72c, 72d, 72e, 72f, 72g and 72h, an acceleration sensor 701, the LEDs 702, an antenna 754 and the like. These elements are connected to a microcomputer 751 or the like (see FIGS. 6 and 7) by lines (not shown) formed on the substrate 700 or the like. The microcomputer 751 functions as exemplary button data generation means according to certain example embodiments, and generates operation button data corresponding to the type of the operation button 72a or the like. This function is a technique in the public domain, and realized by the microcomputer 751 detecting connection/disconnection of lines which is caused by a switch mechanism such as a tactile switch located at a lower side of a key top. More specifically, when the operation button is pressed, for example, the lines are connected, and consequently energized. The microcomputer 751 detects the lines which are energized, and generates a signal corresponding to the type of the operation button.

The wireless module 753 (see FIG. 7) and the antenna 754, which are not shown, allow the controller 7 to act as a wireless controller. A quartz oscillator, which is not shown, is provided in an inside of the housing 71, and generates a reference clock of the microcomputer 751 described later. On the top main surface of the substrate 700, the loudspeaker 706 and an amplifier 708 are provided. The acceleration sensor 701 is provided at the left side of the operation button 72d on the substrate 700 (that is, at a peripheral portion, instead of a center portion, on the substrate 700). Accordingly, the acceleration sensor 701 can detect, in accordance with a rotation centering on the longitudinal direction of the controller 7, acceleration caused by a centrifugal force element as well as directional variation in gravitational acceleration. Accordingly, the stationary apparatus 3 and the like can detect, from the detected acceleration data, the rotation of the controller 7 highly sensitively in accordance with a predetermined calculation.

As shown in FIG. 6, at a front edge of a bottom main surface of the substrate 700, the imaging information calculation section 74 is provided. The imaging information calculation section 74 includes an infrared filter 741, a lens 742, the image pickup element 743, and an image processing circuit 744 which are located in this order from the front side of the controller 7. These elements are attached to the bottom main surface of the substrate 700. At a rear edge of the bottom main surface of the substrate 700, the connector 73 is attached. Further, on the bottom main surface of the substrate 700, a sound IC 707, and the microcomputer 751 are provided. The sound IC 707 is connected to the microcomputer 751 and the amplifier 708 by lines formed on the substrate 700 or the like, and outputs an audio signal to the loudspeaker 706 via the amplifier 708 in accordance with the sound data transmitted from the stationary apparatus 3.

On the bottom main surface of the substrate 700, a vibrator 704 is attached. The vibrator 704 may be, for example, a vibration motor or a solenoid. The vibrator 704 is connected to the microcomputer 751 via the lines formed on the substrate 700 and the like, and is turned on/off in accordance with vibration data transmitted from the stationary apparatus 3. The controller 7 is vibrated when the vibrator 704 is turned on, and vibration is conveyed to the player holding the controller 7. Thus, so-called a vibration-feedback game is realized. The vibrator 704 is located at a relatively front side of the housing 71, and thus the housing 71 vibrates to a large extent while the player is holding the housing 71, whereby the player feels vibration sensitively.

Figure 7:
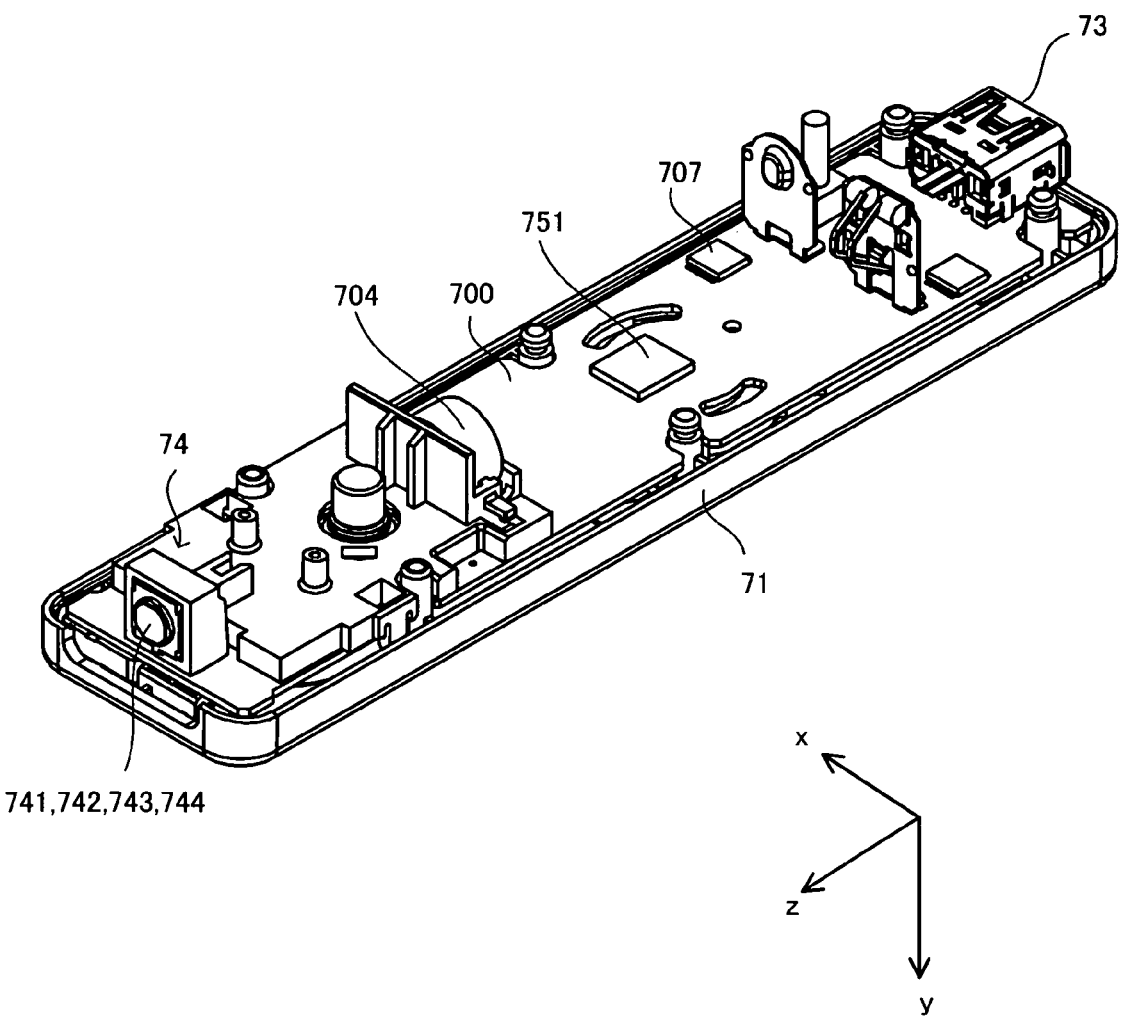
FIG. 7 is a perspective view of the controller 7 shown in FIG. 3 in a state where a lower housing there of is removed.

With reference to FIG. 7, an internal configuration of the controller 7 will be described. FIG. 7 is a block diagram showing a configuration of the controller 7.

As shown in FIG. 7, the controller 7 includes thereinside a communication section 75, in addition to the operation section 72, the imaging information calculation section 74, the acceleration sensor 701, the vibrator 704, the loudspeaker 706, the sound IC 707 and the amplifier 708 which are described as above.

The imaging information calculation section 74 includes the infrared filter 741, the lens 742, the image pickup element 743, and the image processing circuit 744. The infrared filter 741 allows only an infrared radiation in the light incident on the front side of the controller 7 to pass therethrough. The lens 742 converges the infrared radiation which has passed through the infrared filter 741, and outputs the infrared radiation to the image pickup element 743. The image pickup element 743 is a solid-state image pickup element such as a CMOS sensor or a CCD, and picks up an image of the infrared radiation converted by the lens 742. In other words, the image pickup element 743 picks up the image of only the infrared radiation having passed through the infrared filter 741, and generates image data. The image data generated by the image pickup element 743 is processed by the image processing circuit 744. Specifically, the image processing circuit 744 processes the image data obtained from the image pickup element 743 and detects a high brightness position thereof, and outputs, to the communication section 75, a process result data indicative of a result of the detection of a position coordinate point and an area of the high brightness position. The imaging information calculation section 74 is fixed on the housing 71 of the controller 7, and an imaging direction of the housing 71 can be changed by changing the orientation of the housing 71. As will be described later, in accordance with the process result data outputted from the imaging information calculation section 74, a signal corresponding to a position or motion of the controller 7 can be obtained.

It is preferable that the controller 7 includes triaxial (x, y, and x-axes) acceleration sensor 701. The triaxial acceleration sensor 701 detects linear acceleration in three directions, i.e., an up-down direction, a left-right direction, and a front-rear direction. Further, in another embodiment, a biaxial accelerometer may be used which detects linear acceleration in the up-down direction and the left-right direction or any other paired direction) depending on a type of a control signal to be used for a game process. For example, the triaxial or biaxial acceleration sensor 701 may be of a type available from Analog Devices, Inc. or ST Microelectronics N.V. The acceleration sensor 701 may be of an electrostatic capacitance (capacitance-coupling) type which is based on silicon micromachined MEMS (Micro Electro Mechanical Systems) technology. Any other suitable accelerometer technology (e.g., piezoelectronic type or piezoresistance type) now existing or to be developed later may be used to provide the triaxial or biaxial acceleration sensor 701.

As one skilled in the art understands, accelerometers, as used in the acceleration sensor 701, are only capable of detecting acceleration along a straight line (linear acceleration) corresponding to each axis of the acceleration sensor. In other words, a direct output from the acceleration sensor 701 is limited to signals indicative of linear acceleration (static or dynamic) along the respective two or three axes thereof. As a result, the acceleration sensor 701 cannot detect motion, rotation, rotational motion, angular displacement, tilt, position, posture or any other physical characteristics along a non-linear (e.g., arcuate) path.

However, though processing by a computer such as a processor of a game apparatus (e.g., a CPU 10), or a processor of a controller (e.g., the microcomputer 751), in accordance with the acceleration signals outputted from the acceleration sensor 701, additional information relating to the controller 7 can be inferred or calculated (determined), as one skilled in the art will readily understand from the description herein. For example, in the case where processing is performed by a computer on the assumption that a controller accommodating the acceleration sensor is in a static state (that is, in the case where it is only gravitational acceleration that is to be detected by the acceleration sensor), it is possible to understand whether or not, or to what extent, the controller is tilted toward the gravity direction in accordance with the detected acceleration as long as the controller is actually in a static state. Specifically, if a state where an axis to be detected by the acceleration sensor is facing vertically downward direction is set as a standard state, it is possible to find out whether or not the axis to be detected is tilted depending on whether or not 1G (gravitational acceleration) is exerted, and also possible to find out the degree of tilt of the axis to be detected depending on the magnitude of the acceleration. Further, in the case of a multi-axial acceleration sensor, it is possible to find out, in detail, the degree of tilt of each of the axes with respect to the gravity direction by processing the acceleration signal along each of the axes. In this case, the processor may calculate data of a tilt angle of the controller 7 in accordance with the output from the acceleration sensor 701, or alternatively, may infer an approximate tilt angle in accordance with the output from the acceleration sensor 701 without calculating data of the tilt angle. In this manner, by using the acceleration sensor 701 and the processor in a combined manner, it is possible to identify the tilt, the posture, and the position of the controller 7. On the other hand, in the case where it is assumed that the acceleration sensor is in a dynamic state, acceleration corresponding to the motion of the acceleration sensor can be detected, in addition to the gravitational acceleration element. Accordingly, if the gravitational acceleration element is removed through predetermined processing, it is possible to calculate a motion direction and the like of the controller 7. Specifically, in the case where the controller 7 including the acceleration sensor 701 is dynamically accelerated and moved by a hand of a user, various motion and/or positions of the controller 7 can be calculated by processing the acceleration signal generated by the acceleration sensor 701. Even in the case where it is assumed that the acceleration sensor is in the dynamic state, it is possible to calculate a tilt with respect to the gravity direction if the acceleration corresponding to the motion of the acceleration sensor is removed through the predetermined processing. In another embodiment, the acceleration sensor 701 may include a built-in type signal processing apparatus or a dedicated processing apparatus of any other type so as to desirably process the acceleration signal outputted from an embedded accelerometer before outputted to the microcomputer 751. For example, in the case where the acceleration sensor is designed to detect static acceleration (e.g., gravitational acceleration), the built-in type or the dedicated processing apparatus may convert the detected acceleration signal into a tilt angle (or any other desirable parameter) corresponding thereto.

In another embodiment, as a motion sensor for detecting the motion of the controller 7, a gyro-sensor incorporating, for example, a rotating or vibrating element may by used. An exemplary MEMS gyro-sensor that may be used in the present embodiment is available from Analog Devices, Inc. Unlike the acceleration sensor 701, the gyro-sensor is capable of directly detecting rotation (or rotation rate) around an axis of at least one gyroscopic element embedded therein. Thus, due to fundamental differences between a gyro-sensor and an acceleration sensor, processing performed on the output signal from these devices needs to be changed as appropriate, depending on which device is selected for a particular application.

Specifically, a significant change is performed in the case where the tilt and the posture are calculated by using the gyro-sensor instead of the acceleration sensor. That is, in the case of using the gyro-sensor, a value of the tilt is initialized at the time of starting detection. The angular rate data outputted from the gyro-sensor is then integrated. Variation in tilt from the initialized value of the tilt is calculated. In this case, the tilt to be calculated corresponds to a value of an angle. On the other hand, in the case where the tilt is calculated by the acceleration sensor, the tilt is calculated by comparing values of respective axes elements of the gravitational acceleration to predetermined standards corresponding thereto, respectively. Accordingly, the tilt to be calculated can be represented by a vector, and thus an absolute direction detected by the accelerometer can be detected without performing initialization. Further, a type of the value detected as the tilt is represented by the angle in the case of using the gyro-sensor, and is represented by the vector, on the other hand, in the case of using the acceleration sensor. Therefore, in the case of using the gyro-sensor instead of the acceleration sensor, the tilt data needs to be converted in an appropriate manner, in consideration of the difference between the two devices. Since characteristics of the gyro-sensor as well as fundamental differences between the accelerometer and the gyro-sensor are well known by the one skilled in the art, further description thereof will be omitted. On the one hand, the gyro-sensor has the advantage of being capable of directly detecting rotation. On the other hand, the acceleration sensor is generally a cost-effective option as compared to the gyro-sensor when used for the controller of the present embodiment.

The communication section 75 includes the microcomputer 751, a memory 752, a wireless module 753, and the antenna 754. The microcomputer 751 controls the wireless module 753 for wirelessly transmitting the transmission data while using the memory 752 as a storage area at the time of processing. Further, the microcomputer 751 controls operations of the sound IC 707 and the vibrator 704 in accordance with the data received by the wireless module 753 from the stationary apparatus 3 via the antenna 754. The sound IC 707 processes the sound data and the like transmitted from the stationary apparatus 3 via the communication section 75. Further, the microcomputer 751 actuates the vibrator 704 in accordance with the vibration data (e.g., a signal for turning the vibrator 704 ON or OFF) and the like which is transmitted from the stationary apparatus 3 via the communication section 75.

Data from the controller 7 such as an operational signal (key data) from the operation section 72, an acceleration signal (x, y, and z-axes directional acceleration data, hereinafter simply referred to as acceleration data) from the acceleration sensor 701, and the process result data from the imaging information calculation section 74 are outputted to the microcomputer 751. The microcomputer 751 temporarily stores the inputted data (the key data, the acceleration data, and the process result data) in the memory 752 as the transmission data to be transmitted to the wireless controller module 19. The wireless transmission from the communication section 75 to the wireless controller module 19 is performed at predetermined time intervals. Since the game process is generally performed at an interval of 1/60 sec., the wireless transmission needs to be performed at an interval of a shorter time period. Specifically, the game process is performed at an interval of 16.7 ms (1/60 sec.), and a transmission interval of the communication section 75 which is composed of the Bluetooth (registered trademark) is 5 ms, for example. At a timing of performing a transmission to the wireless controller module 19, the microcomputer 751 outputs the transmission data stored in the memory 752 to the wireless module 753 as a series of pieces of operation information. Based on the Bluetooth (registered trademark) technology, for example, the wireless module 753 modulates the operation information by using a carrier wave having a predetermined frequency, and emits the modulated radio signal from the antenna 754.

Thus, the key data from the operation section, the acceleration data from the acceleration sensor 701, and the process result data from the imaging information calculation section 74, which are all data from the controller 7, are modulated by the wireless module 753 into the radio signal and transmitted from the controller 7. The radio signal is received by the wireless controller module 19 of the stationary apparatus 3, and the radio signal is then demodulated or decoded by the stationary apparatus 3, whereby the series of pieces of operation information (the key data, the acceleration data, and the process result data) are obtained. The CPU 10 of the stationary apparatus 3 performs the game process in accordance with the obtained operation information and the game program. In the case where the communication section 75 is configured by using the Bluetooth (registered trademark) technology, the communication section 75 may also have a function of receiving transmission data which is wirelessly transmitted from other devices.

(Configuration of the Hand-Held Game Apparatus 40)

Figure 9:
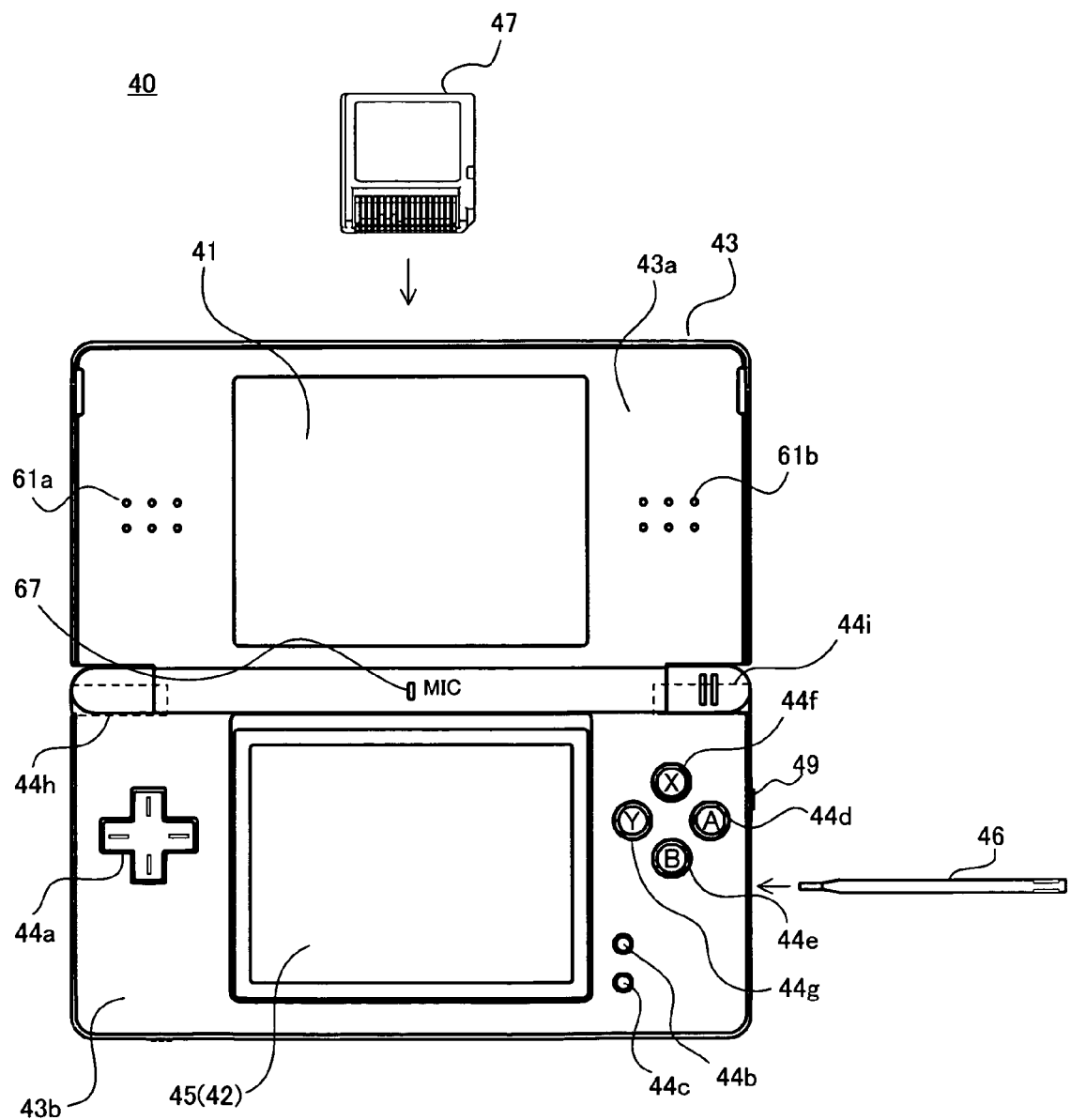
FIG. 9 is an external view of a hand-held game apparatus 40 according to certain example embodiments.

FIG. 9 is an external diagram of the hand-held apparatus 40 according to certain example embodiments. As shown in FIG. 9, the hand-held apparatus 40 includes a first LCD (Liquid Crystal Display) 41, and a second LCD 42. A housing 43 thereof is composed of an upper housing 43a and a lower housing 43b. The first LCD 41 is accommodated in the upper housing 43a, and the second LCD 42 is accommodated in the lower housing 43b. Each of the first LCD 41 and the second LCD 42 has a resolution of 256 dots×192 dots. Although an LCD is used as a display device in the present embodiment, any other display device, for example, a display device using an EL (Electro Luminescence), may be used. Further, the resolution may be arbitrarily chosen.

On the upper housing 43a, provided are loudspeaker holes 61a and 61b for outputting a sound from a pair of loudspeakers (60a and 60b shown in FIG. 10) described later.

On the hinge section which connects the upper housing 43a and the housing 43b in a foldable manner, microphone holes 67 are provided.

On the lower housing 43b, provided as input devices are a cross key 44a, a start switch 44b, a select switch 44c, an A button 44d, a B button 44e, an X button 44f, and a Y button 44g. At the top left corner part of the lower housing 43d, an L button 44h is provided. At the top right corner part of the lower housing 43d, an R button 44i is provided. Further, as an additional input device, the second LCD 42 has a touch panel 45 mounted on a screen thereof. To a surface of the touch panel 45, a guiding frame 34 is attached. Provided to the lower housing 43b are a power switch 49, an insertion slot for accommodating a memory card 47, and a receptacle for accommodating a stylus pen 46.

The touch panel 45 is a resistive film type touch panel. Note that, certain embodiments may use a given pressing type touch panel instead of a resistive film touch panel. The touch panel 45 can be controlled not only with the stylus pen 46, but also with a finger of a user. In the present embodiment, the touch panel 45 has a resolution (detection accuracy) of 256 dots×192 dots, similar to the resolution of the second LCD 42. However, the touch panel 45 does not necessarily have the same resolution as the second LCD 42.

The memory card 47 is a storage medium having a game program stored therein, and is detachably inserted into the insertion slot provided to the lower housing 43b.

Next, with reference to FIG. 10, an internal configuration of the hand-held game apparatus 40 will be described.

Figure 10:
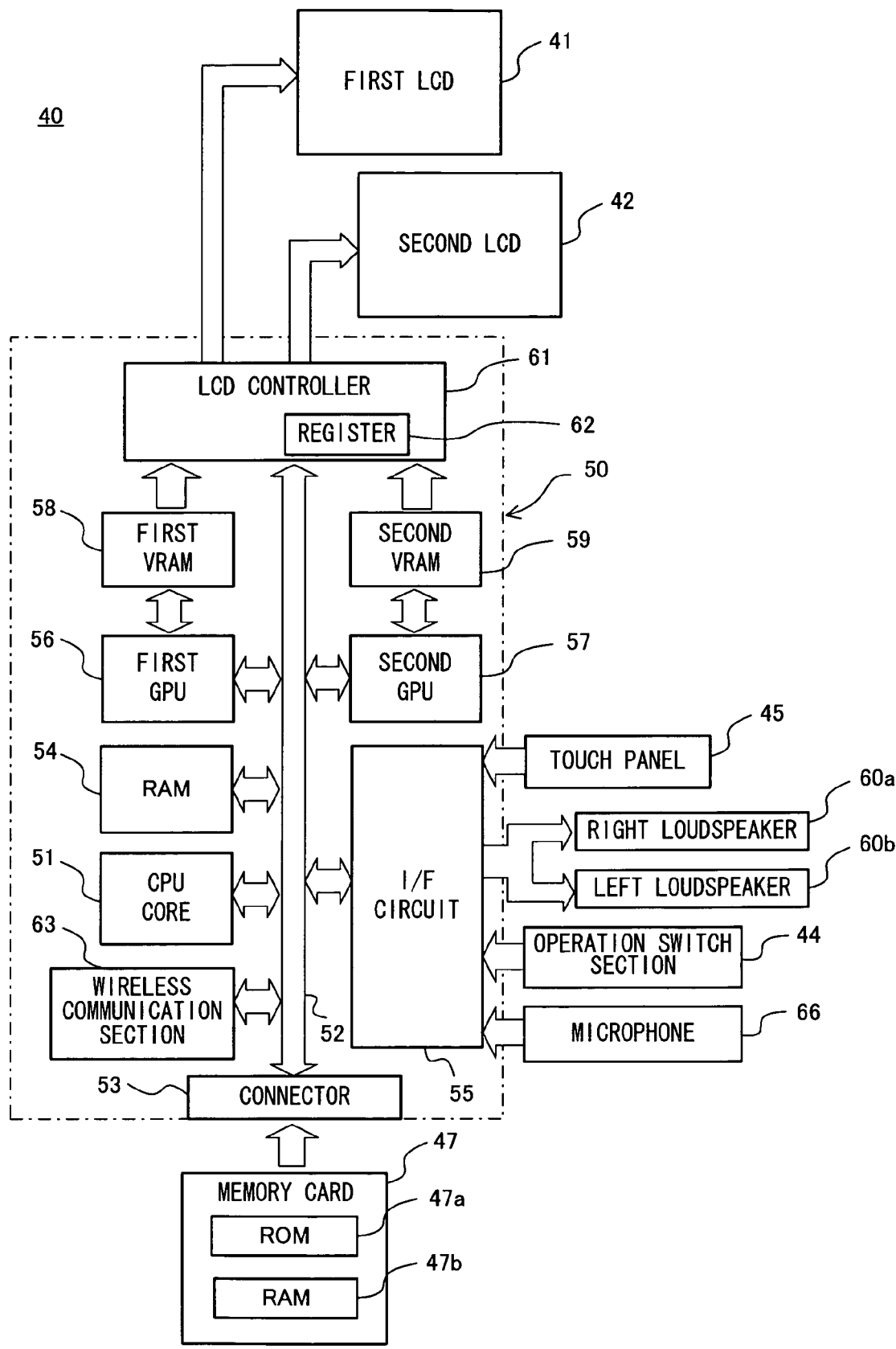
FIG. 10 is a block diagram of the hand-held game apparatus 40 according to certain example embodiments.

As shown in FIG. 10, an electronic circuit substrate 50 accommodated in the housing 43 has a CPU core 51 mounted therein. The CPU core 51 is connected, via a bus 52, to a connector 53, I/O interface circuit (denoted as an I/F circuit in the diagram) 55, a first GPU (Graphics Processing Unit) 56, a second GPU 57, a RAM 54, an LCD controller 61, and a wireless communication section 63. The memory card 47 is detachably connected to the connector 53. The memory card 47 has mounted therein a ROM 47a for storing therein the game program and a RAM 47b for rewritably storing therein backup data. The game program stored in the ROM 47a of the memory card 47 is loaded into the RAM 54, and the game program loaded into the RAM 54 is executed by the CPU core 51. In addition to the game program, temporary data which is obtained by the CPU core 51 executing the game program and data for generating a game image are stored in the RAM 54. Connected to the I/F circuit 55 are the touch panel 45, the right loudspeaker 60a, the left loudspeaker 60b, an operation switch section 44 including the cross key 44a shown in FIG. 1, the A button 44d and the like, and a microphone 66. The right loudspeaker 60a and the left loudspeaker 60b are respectively placed inside the loudspeaker holes 61a and 61b. The microphone 66 is placed inside the microphone holes 67.

The first GPU 56 is connected to a first VRAM (Video RAM) 58. The second GPU 57 is connected to a second VRAM 59. In response to an instruction from the CPU core 51, the first GPU 56 generates a first game image, and writes the first game image into the first VRAM 58 in accordance with data for generating the game image stored in the RAM 54. In a similar manner, in response to the instruction from the CPU core 51, the second GPU 57 generates a second game image and writes the second game image into the second VRAM 59. The first VRAM 58 and the second VRAM 59 are each connected to the LCD controller 51.

The LCD controller 61 includes a register 62. The register 62 stores a value "0" or "1" in accordance with an instruction from the CPU core 51. In the case where the value of the register 62 is 0, the LCD controller 61 outputs the first game image having been written into the first VRAM 58 to the first LCD 41, and outputs the second game image having been written into the second VRAM 59 to the second LCD 42. In the case where the value of the register 62 is 1, the LCD controller 61 outputs the first game image having been written into the first VRAM 58 to the second LCD 42, and outputs the second game image having been written into the second VRAM 59 to the first LCD 41.

The wireless communication section 63 has a function of exchanging, among wireless communication sections of the stationary apparatus 3 and the other hand-held apparatuses 40, data used for the game process and other data.

Certain example embodiments may be applicable to any apparatus having a pressing type touch panel supported by a housing. For example, certain example embodiments may include or be applied to a hand-held game apparatus, a controller of a stationary game apparatus, and a PDA (Personal Digital Assistant). Certain example embodiment may also be applicable to an input device which does not have a display placed under the touch panel.

Next, an overview of a game assumed in the present embodiment will be described. First, introduction (a providing form) of cooperative music playing game software to respective apparatuses in the present embodiment will be described. The cooperative music playing game software executed on the stationary apparatus 3 (hereinafter referred to as "cooperative music play software for stationary apparatus") is downloaded from a predetermined server, and stored in the flash memory 17. The software is executed on the stationary apparatus 3, whereby the cooperative music playing game of the present embodiment can be played. The cooperative music play software for stationary apparatus having been downloaded as above described includes a cooperative music playing game program for the hand-held apparatuses 40, which will be described later. In the present embodiment, the cooperative music playing game program is distributed to some of the hand-held apparatuses 40. Hereinafter the cooperative music playing game program is referred to as a "distribution program". Further, the cooperative music play software for stationary apparatus includes sounds (audio data) of various musical instruments used for playing a musical composition, but does not include data of the musical composition to be played (musical composition data) as described later.

On the other hand, the cooperative music playing game software executed on the hand-held apparatuses 40 is provided in two forms. That is, the cooperative music playing game software is provided either in the form of the memory card 47, or by being downloaded from the stationary apparatus 3. The software provided in the form of the memory card 47 is configured so as to be played with a single apparatus (for a single game player). Further, data (musical score data or the like) of a musical composition to be played is also stored as a part of the software in the memory card 47. The memory card 47 having the cooperative music playing game software stored therein is inserted into the hand-held game apparatus 40, and the hand-held game apparatus 40 is actuated, whereby the cooperative music playing game software (hereinafter referred to as a packaged cooperative music play software) is executed.

In the other providing form, the above-described distribution program is downloaded from the stationary apparatus 3. The distribution program is executed on the hand-held apparatus 40 into which the above-described memory card 47 is not inserted. The distribution program is used only in the cooperative music playing game process according to the present embodiment, and cannot be used for playing by a single player or with a single apparatus.

That is, there are two types of hand-held apparatuses 40. One is the hand-held apparatus (hereinafter referred to as a "leader apparatus") into which the memory card 47 is inserted so as to execute the game program (the packaged cooperative music play software). The other is the hand-held apparatus (hereinafter referred to as a "memory apparatus") into which the memory card 47 is not inserted, and in which the distribution program is executed by downloading the same from the stationary apparatus 3.

Figure 11:
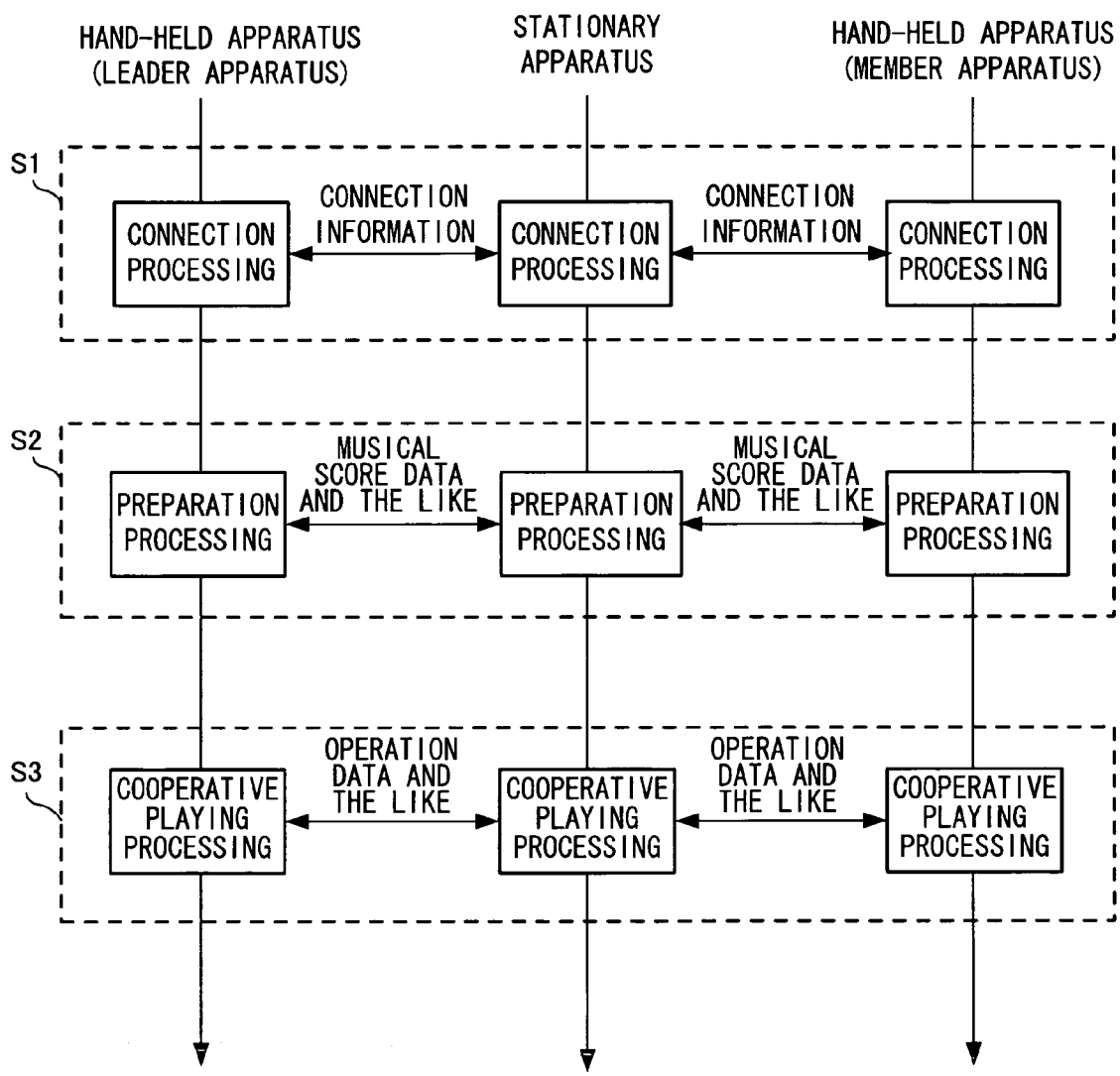
FIG. 11 is a diagram showing an overview of a flow of a cooperative music playing game process in certain example embodiments.

With reference to FIG. 11, an overview of a flow of the cooperative music playing game process in the present embodiment will be described. As shown in FIG. 11, first of all, connection processing for connecting the stationary apparatus 3, the leader apparatus, and the member apparatus to one another is performed (step S1). In the processing, connection information is exchanged among the apparatuses, and a communication path centering on the stationary apparatus 3 is established.

When the communication path has been established, preparation processing is executed (step S2). In the processing, preparation for executing the cooperative music playing game is performed. Specifically, processing for downloading the distribution program into the member apparatuses, for transmitting musical composition data to be played cooperatively, and for determining parts to be played by respective players is performed.

Upon completion of the preparation processing, cooperative playing processing is performed while respective game apparatuses are synchronized with one another (step S3). In the processing, a plurality of direction signs (such as note header 107 described later) for indicating contents of operations to be played by respective players is displayed on respective screens of the leader apparatus and the member apparatus. Each of the players performs an operation to play each of the parts of a musical composition in accordance with the directional signs displayed on the screen of the hand-held apparatus 40 held by each of the players. Operation data of each of the players is transmitted to the stationary apparatus 3. In the present embodiment, the game process is performed at the interval of 1/60 second. Therefore, in the present embodiment, the operation data is transmitted at an interval of 1/60 second. In the stationary apparatus 3, in accordance with the operation data, processing for outputting a sound from the stationary apparatus 3 is performed. As a result, the sound (cooperative play sounds) having reflected therein the operation performed by each of the players is outputted from the loudspeakers of the television 2 connected to the stationary apparatus 3.

Figure 12:
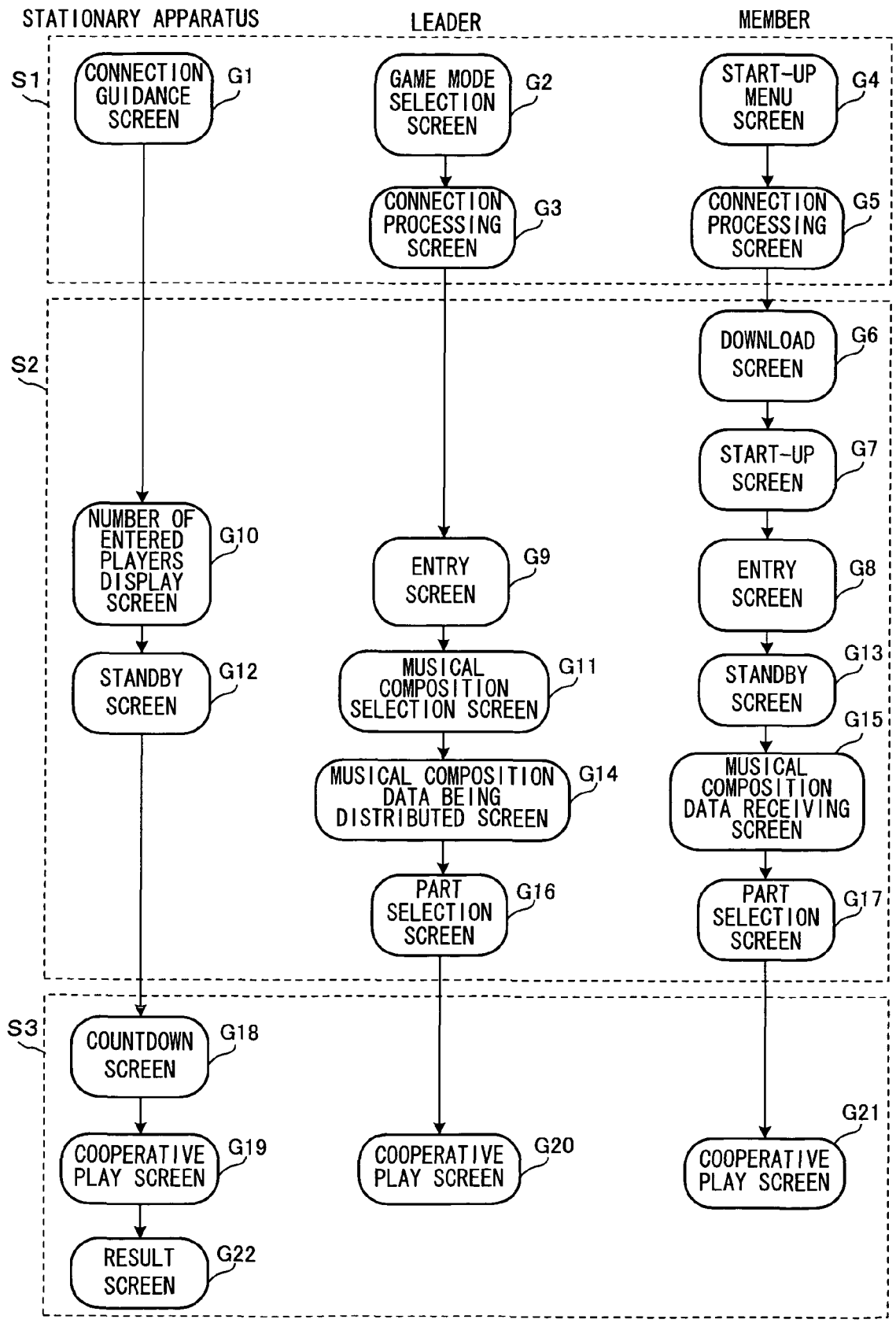
FIG. 12 is a diagram showing an exemplary game screen transition in certain example embodiments.

Next, a flow of the present cooperative music playing game will be described in detail by illustrating an exemplary screen transition. FIG. 12 is a diagram showing an exemplary game screen transition assumed in the present embodiment.

A flow of the game in the above-described connection processing (step S1 shown in FIG. 11) will be described. As shown in FIG. 12, in the stationary apparatus 3, the cooperative music play software for stationary apparatus which has been downloaded from a predetermined server is started up. The connection guidance screen (G1) is then displayed on the television 2. Operational guidance is displayed in the screen for each of the leader apparatus and the member apparatus. For example, a message may be displayed stating "if you have a game card, select 'cooperative play' from the menu. If you do not have the game card, select 'download play,'" and the like is displayed.

After the above-described operation guidance screen is displayed, the packaged cooperative music play software which is stored in the memory card 47 is started up in the leader apparatus. A game mode selection screen is then displayed on the second LCD 42 (G2). In the screen, a player can select not only a multiple-player play, but also a single-player play. A player holding the leader apparatus selects the multiple-player play from the game mode selection screen. The processing (connection processing) for establishing connection between the leader apparatus and the stationary apparatus is then performed. A connection processing screen indicative of being connecting is displayed until the connection processing is completed (G3).

On the other hand, in the case of the member apparatus, after the above-described operation guidance screen is displayed, the player turns on the power of the member apparatus. A start-up menu is displayed on a screen of the member apparatus (G4). From the start-up menu, the player can select a "download play" for downloading a program from another game apparatus and executing the same, a "setting" for performing various settings (such as a time setting) of the hand-held apparatus 40, and the like. The player selects the "download play" in the screen. Processing (the connection processing) for establishing connection between the member apparatus and the stationary apparatus 3 is then performed. The connection processing screen indicative of being connecting is displayed until the connection processing is completed (G5).

A flow of the game in the above-described preparation processing (step S2 shown in FIG. 11) will be described. The preparation processing is generally divided into four types of processing, i.e., processing for downloading the distribution program, entry processing, musical composition selection processing, and part selection processing. When the above-described connection processing is completed, the processing for downloading the distribution program from the stationary apparatus 3 is performed in the member apparatus. Until the downloading is completed, a screen indicative of being downloaded (G6) is displayed. Although not shown in the diagram, a screen indicating that the member apparatus is performing downloading may be displayed in the leader apparatus or the stationary apparatus 3.

When downloading of the distribution program has been completed, the distribution program is started up in the member apparatus, and a start up screen (G7) is displayed. Subsequently, in accordance with an operation performed by the player, an entry screen (G8) is displayed. The entry screen allows the player to enter the cooperative music playing game. Specifically, the player performs operations for inputting his/her name (or nickname) and transferring the same to the stationary apparatus 3, thereby completing the entry. At approximately the same timing as this, a similar entry screen (G9) is displayed in the leader apparatus. In the stationary apparatus 3, a screen (G10) for displaying the number of players having been entered is displayed.

When the entry has been completed, the musical composition selection processing is performed to select a musical composition to be played cooperatively. Selection of the musical composition is performed on the leader apparatus. Specifically, on the leader apparatus, a list of musical compositions is displayed on the screen (G11). At this moment, in each of the stationary apparatus 3 and the member apparatus, a standby screen (G12, G13) is displayed.

The player of the leader apparatus selects a desired musical composition from the list of the musical compositions displayed on the screen. A screen indicative of a musical composition being distributed (G14) is then displayed. Musical composition data corresponding to the selected musical composition is read from the memory card 47, and then transmitted to the stationary apparatus 3. The stationary apparatus 3 receives the musical composition data transmitted from the leader apparatus, and the musical composition data is stored in the memory embedded in the stationary apparatus 3. The musical composition data is then distributed from the stationary apparatus 3 to the member apparatus. When the distribution of the musical composition data from the stationary apparatus 3 starts, a musical composition data receiving screen (G15) is displayed, and processing for receiving the musical composition data is performed in the member apparatus.

Figure 13:
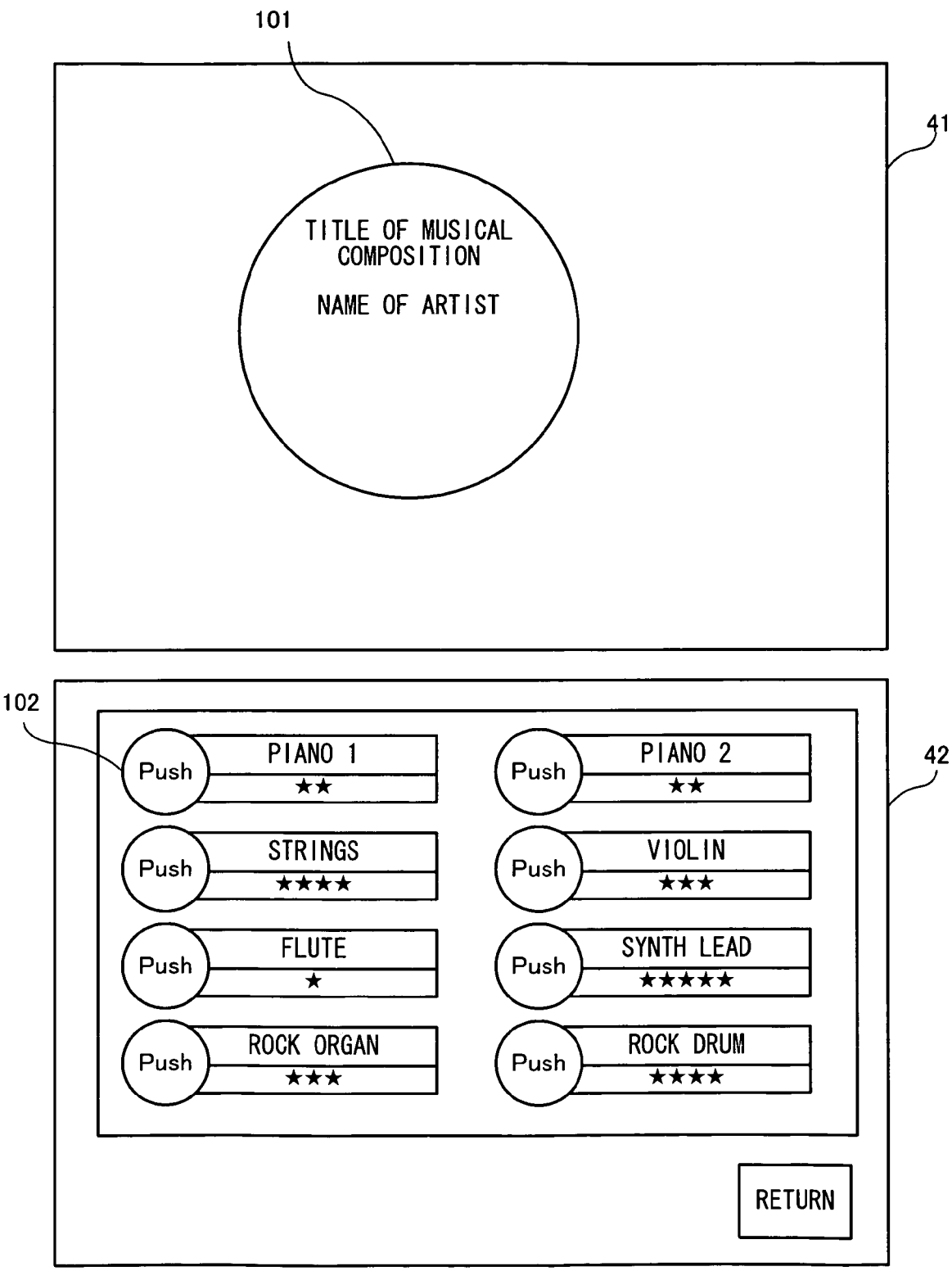
FIG. 13 shows an exemplary cooperative music playing game screen in certain example embodiments.

When the processing for receiving the musical composition data has been completed in the member apparatus, a part selection screen (G16, G17) is displayed in each of the leader apparatus and the member apparatus. In the screen, each player performs an operation to select a part of the music composition to be taken charge of. FIG. 13 shows, in detail, a part selection screen. As shown in FIG. 13, in the first LCD 41, information 101 on the selected musical composition is displayed in a disk-like shape. In an example shown in FIG. 13, a title of the musical composition and a name of an artist are displayed. In the second LCD 42, parts (names of the musical instruments) composing the musical composition are listed. With respect to each of the parts, star(s) and a "PUSH" button 102 are displayed, and the number of the stars indicates a difficulty level of each of the musical instruments to be played. Each of the players presses, on the touch panel, the "PUSH" button 102 of a part which the player wishes to take charge of, thereby selecting the part. With respect to part selection, the part is selected on a first-come-first-served basis, in the present embodiment. For example, if one player selects a part of "piano 1", the information is promptly transmitted to the hand-held apparatuses 40 held by the remaining players via the stationary apparatus 3. With respect to the selected part, a display indicating that the part has been selected is displayed on each of the hand-held apparatuses 40, and then the selected part becomes un-selectable. When each of the players has selected the part to be played, the preparation processing is completed.

A flow of the cooperative playing processing of the game (step S3 of FIG. 11) will be described. With reference back to FIG. 12, when the preparation processing has been completed, and the start switch 44*b* is pressed in the leader apparatus, a countdown screen (G18) is displayed in the stationary apparatus 3 so as to inform a start of the cooperative play of the musical composition. In the stationary apparatus 3, a screen indicative of being playing cooperatively (G19) is displayed thereafter. Further, also in each of the leader apparatus and the member apparatus, the screen indicative of being playing cooperatively (G20, G21) is displayed.

Figure 14:
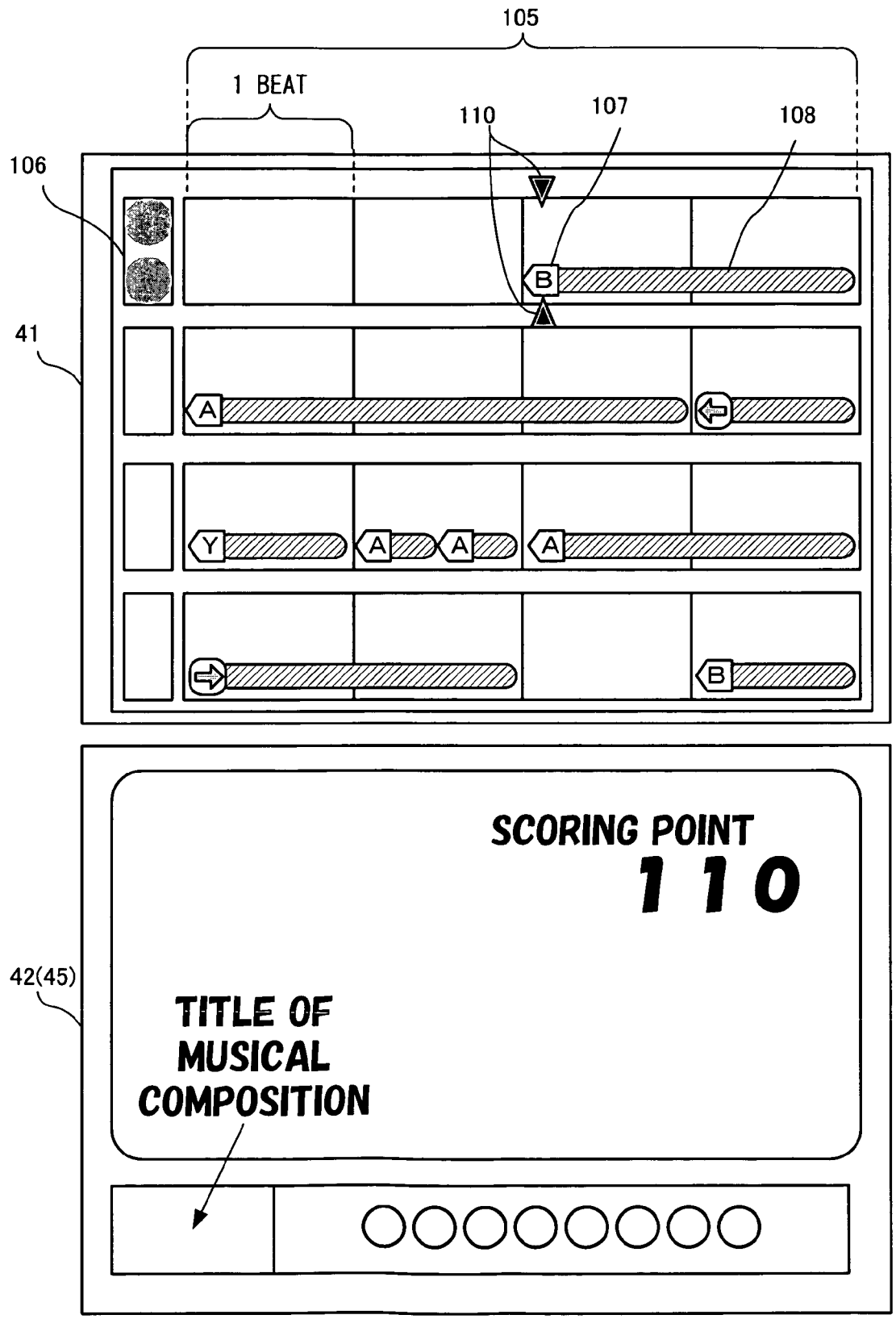
FIG. 14 shows another exemplary cooperative music playing game screen in certain example embodiments.

FIG. 14 is a diagram showing, in detail, the above-described screen indicative of being playing cooperatively displayed in each of the hand-held apparatuses 40. As shown in FIG. 14, a musical score screen is displayed on the first LCD 41. On the second LCD 42, various pieces of information such as the title and a scoring point of the musical composition is displayed.

On the musical score screen displayed on the first LCD 41, four tracks 105 each having one bar are arranged and displayed vertically. The tracks 105 are scrolled up on the screen in accordance with the progress of the musical composition. Further, on the left side of each of the tracks, a light 106 is displayed. The track 105 whose lights 106 are blinking is a target track currently being played (operated).

Each of the tracks 105 is divided with vertical lines into four areas. Each of the areas represents one beat (a length of a quarter note). On the track 105, note header 107 indicative of a name of a button to be operated by a player, and a note tail 108 indicating that the button is continuously pressed are displayed. The name of the button displayed at the note header 107 is any one of the cross key 44*a*, the A button 44*d*, the B button 44*e*, the X button 44*f*, the Y button 44*g*, the L button 44*h*, and the R button 4*i*. Further, in the case of cross key 44*a*, any one of arrows indicating upward, downward, left, and right directions are displayed. For example, when "A" is displayed at the note header 107, the A button 44*d* (see FIG. 9) is to be pressed. Further, when "←" is displayed, the left key of the cross key 44*a* is to be pressed.

Here, it is assumed that the minimum unit of a sound length of the present cooperative music playing game is equivalent to a length of a sixteenth note. That is, one note header 107 is equivalent to the sixteenth note. In accordance with a length of the note tail 108 subsequent thereto (i.e., a combination of the note header 107 and the note tail 108), an eighth note, a quarter note and the like are indicated.

Further, at upper and lower sides of the track 105, a cursor 110 indicative of an operation position (i.e., a position of a musical composition to be played) is displayed. The cursor 110 moves along the track 105 from left to right in accordance with the progress of the musical composition (and when the cursor reaches to the right edge, the cursor moves to the left edge of the next track). That is, the player performs an operation at a position where the cursor 110 is located on the track 105 whose light 106 is blinking. In an example shown in FIG. 14, the cursor 110 is located at a position of the note header 107 on which "B" is displayed. Therefore, the player needs to press the B button 44*e* at the timing shown in FIG. 14 (and keep pressing the B button 44*e* until the note tail 108 discontinues).

A predetermined sound scale is assigned to each of the buttons. For example, "so" is assigned to the A button 44*d*, and "1*a*" is assigned to the B button 44*e*. In the present embodiment, assignment of sound keys (sound key map) is previously defined in a cooperative playing program. The sound key map used in the stationary apparatus 3 is the same as that used in the hand-held apparatus 40.

Further, in the present embodiment, in addition to the operations of the cross key 44*a* and the like, a touch panel operation is performed during playing a musical composition. The touch panel operation is used, for example, when a part of guitar is played. At the time of playing the guitar part, a player slides fingers of the player on the touch panel, whereby the player feels as if playing an actual guitar. Further, the touch panel operation may be used in combination with the operations of the buttons.

In this manner, each of the players operates the buttons, in a timely manner, in accordance with contents of the note header 107, the note tail 108, and the like displayed on each of the hand-held apparatuses 40. The operation data indicative of the contents of the operations is successively transmitted to the stationary apparatus 3. In the stationary apparatus 3, processing for outputting a sound based on the operation data is then performed. Accordingly, the sound (sound played in a cooperative manner) having reflected therein the button operation of each of the players is outputted from the stationary apparatus.

Figure 15:
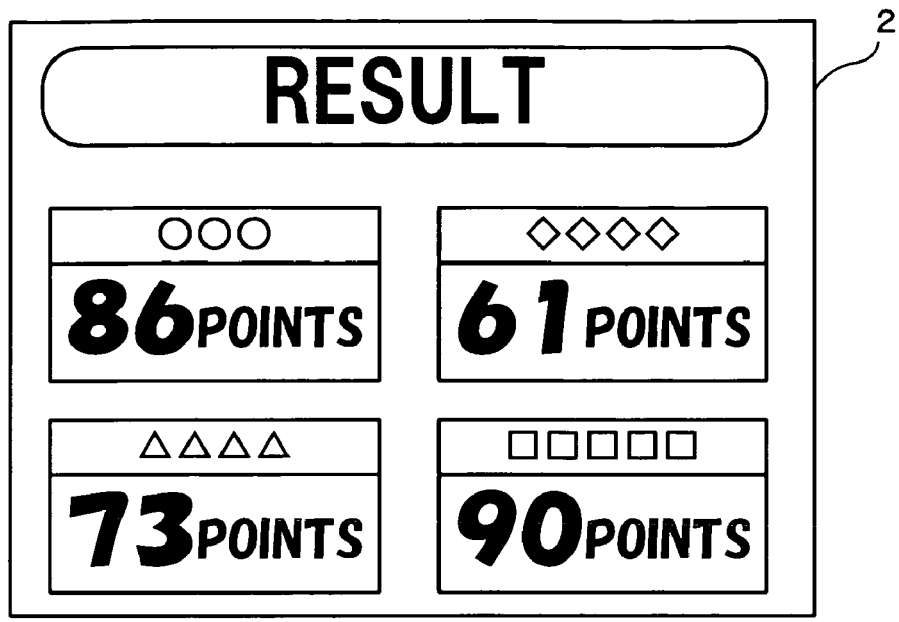
FIG. 15 shows another exemplary cooperative music playing game screen in certain example embodiments.

With reference back to FIG. 12, when the cooperative playing processing has been completed, a result screen (G22) is finally displayed on the television 2. FIG. 15 shows an exemplary result screen. The screen displays a scoring point of each of the players.

Figure 16:
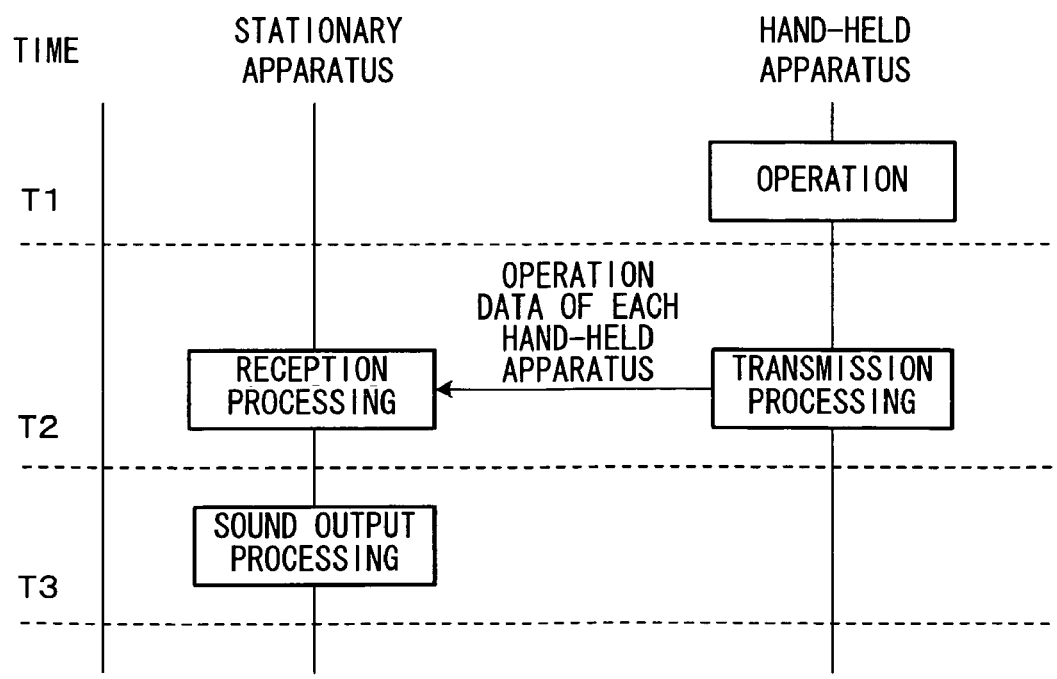
FIG. 16 is a diagram schematically showing a principle of processing according to certain example embodiments.

In this manner, in the present embodiment, the operation data of each of the hand-held apparatuses 40 is transmitted to the stationary apparatus 3, and the sound outputting processing is performed in the stationary apparatus 3. FIG. 16 schematically shows a principle of the processing according to certain example embodiments. Compared to FIG. 33, which shows conventional processing, the number of pieces of processing performed, from the operation to the sound output, is less by 1, in FIG. 16. That is, processing shown in FIG. 33 is composed of times T1 to T4, whereas the processing shown in FIG. 16 is composed of times T1 to T3. In other words, processing for transmitting operation data of respective players from the master apparatus to the slave apparatuses, which has been performed conventionally, is not required in the cooperative music playing game according to the present embodiment. Therefore, compared to the conventional processing, it is possible to reduce a time lag between the operation and the sound output. Particularly, with respect to the communication processing between the stationary apparatus 3 and each of the hand-held apparatuses 40, the operation data is only sent from each of the hand-held apparatuses 40 to the stationary apparatus 3. Accordingly, processing composed of times T1 to T3 can be satisfactory performed within a processing time period of one frame. As a result, it is possible to provide the player with a comfortable play feeling without causing the player to feel the time lag in the sound output.

Further, since the sound outputting processing is performed on the stationary apparatus 3, higher quality sound data (heavy data) can be processed compared to a case where the sound processing is performed by using the hand-held apparatus 40 which has a CPU of relatively low processing speed. Accordingly, a high quality sound can be outputted, whereby amusingness of the cooperative music playing game can be enhanced.

Figure 17:
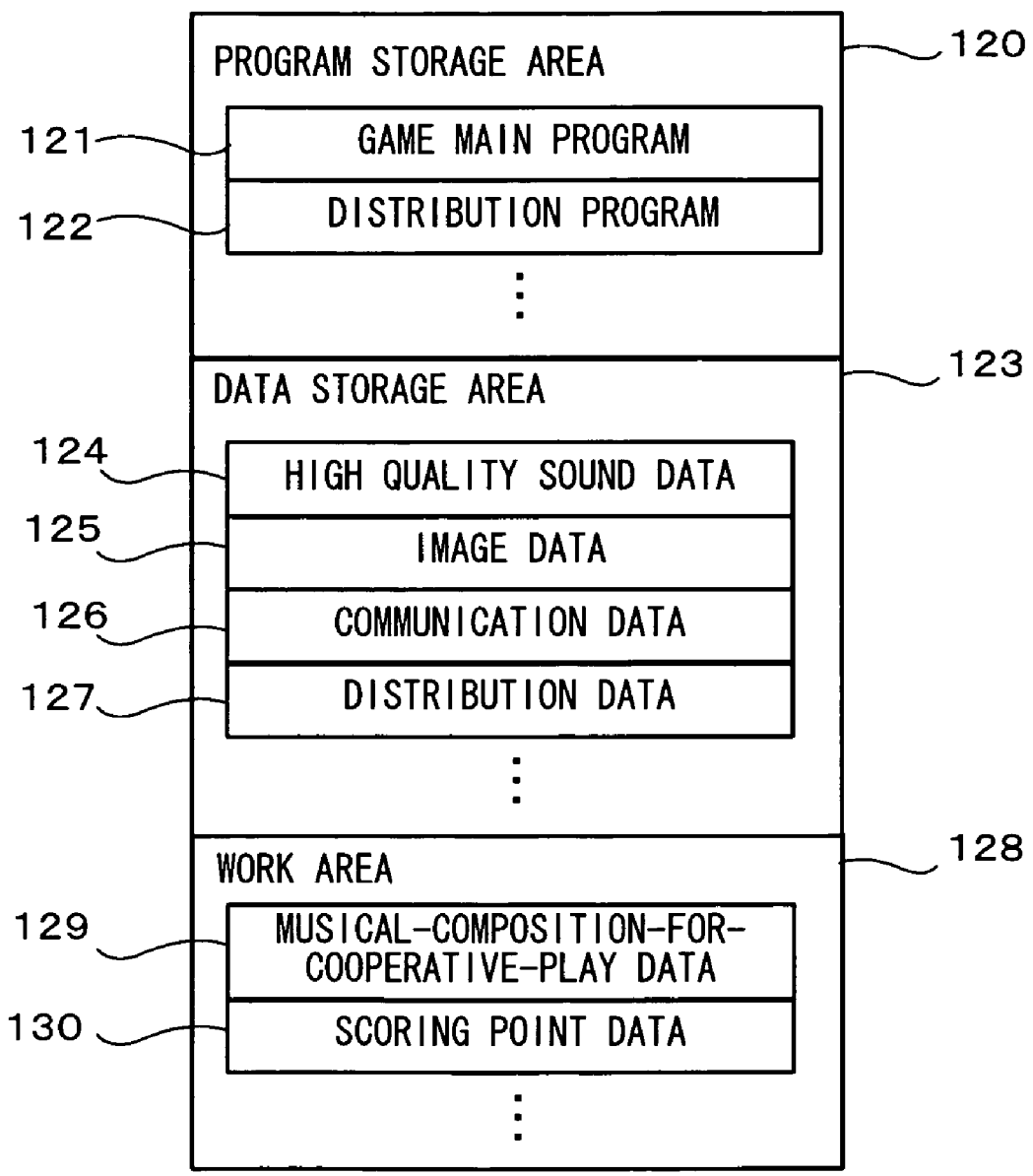
FIG. 17 is a diagram showing a memory map of an external main memory 12 shown in FIG. 3.

Next, respective pieces of data used in the present embodiment will be described. First, data relating to the stationary game apparatus 3 will be described. FIG. 17 is a diagram showing a memory map of the external main memory 12 (which, may be replaced with the internal main memory 11*e*, or may be used in combination with the internal main memory 11*e*) shown in FIG. 3. As shown in FIG. 17, the external main memory 12 includes a program storage area 120, a data storage area 123, and a work area 128. Data in the program storage area 120 and the data storage area 123 corresponds to such data that is downloaded from a predetermined server, stored in the flash memory 17, and then copied into the external main memory 12 at the time of the cooperative music playing game.

The program storage area 120 has stored therein a game program executed by the CPU 10. The game program is composed of a game main program 121, a distribution program 122, and the like.

Figure 27:
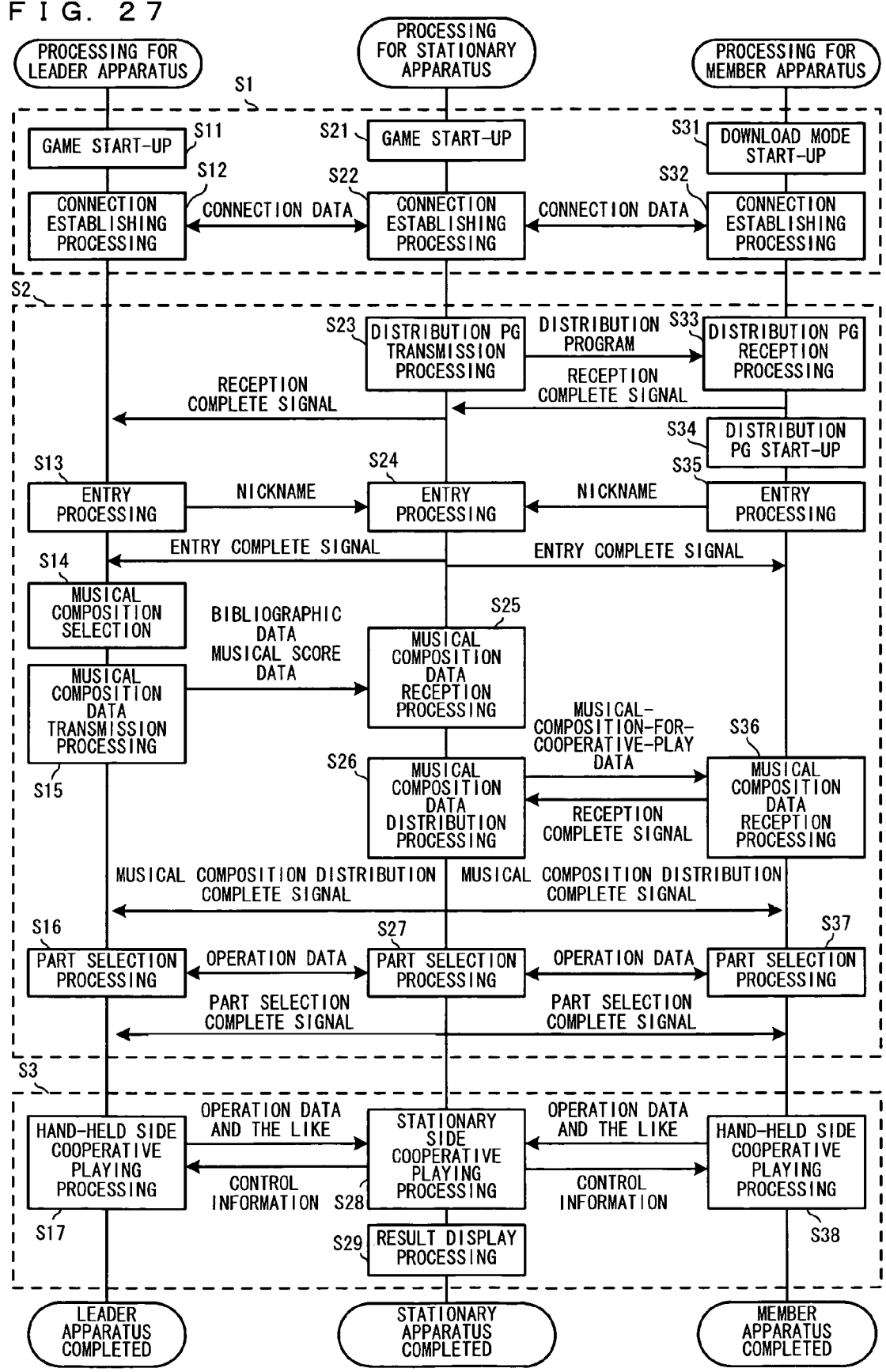
FIG. 27 is a diagram showing, in detail, a flow of a cooperative music playing game process according certain example embodiments.

The game main program 121 is a program corresponding to processing in a flowchart (a part of processing on the stationary apparatus) shown in FIG. 27 described later. The distribution program 122 is a program distributed to the member apparatus (a program executed on the member apparatus).

The data storage area 123 has stored therein various flags used during the game process as well as high quality sound data 124, image data 125, communication data 126, distribution data 127, and the like.

The high quality sound data 124 is data representing sound waveform data of all the musical instruments used in the cooperative music playing game. In the present embodiment, all the sound scales are not stored, but several sound scales are stored as reference sounds. For example, the sound waveform data of only "do" and "so" is stored. In the sound outputting processing, the sound waveform data is processed as appropriate so as to generate and output other sound scales. Further, the high quality sound data 124 represents a higher sound quality compared to low sound quality data 148 stored in the hand-held apparatus 40 described later. For example, the high quality sound data includes the sound waveform data of a higher sampling rate compared to the low sound quality data 148.

The image data 125 is data relating to various images displayed on the television 2 during the cooperative music playing game. The communication data 126 is various data necessary to perform communication with the hand-held apparatuses 40.

The distribution data 127 is used in the distribution program. The distribution data 127 includes image data or the like displayed on the member apparatus. Therefore, the distribution data 127 is distributed to the member apparatus together with the distribution program.

The work area 128 has stored therein musical-composition-for-cooperative-play data 129, scoring point data 130, and the like. The musical-composition-for-cooperative-play data 129 is transmitted from the leader apparatus. A content of the musical-composition-for-cooperative-play data 129 is data of one musical composition to be played cooperatively, among musical composition data 146 stored in the leader apparatus described later. The scoring point data 130 stores therein scoring point data which is transmitted from each of the hand-held apparatuses 40. The scoring point data 130 is used to display the scoring point as shown in FIG. 15.

Figures 18, 19:
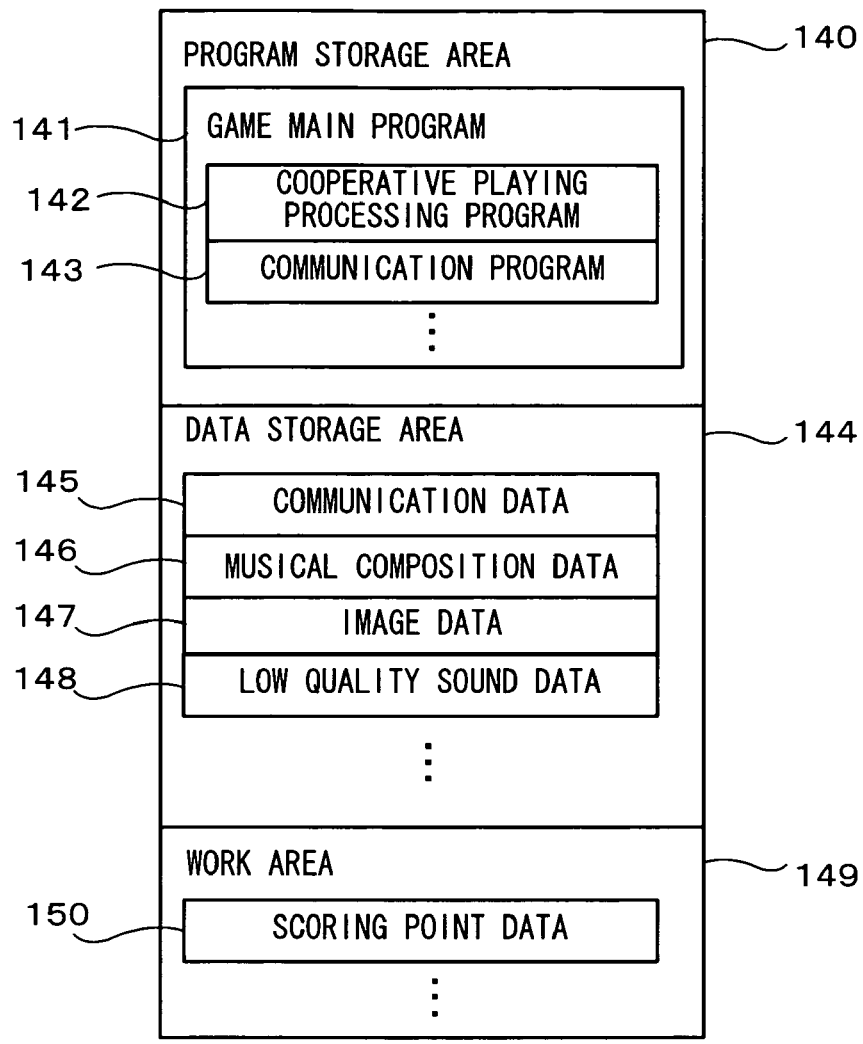
FIG. 18 is a diagram showing a memory map of a RAM 54 of a leader apparatus.
FIG. 19 is a diagram showing an exemplary data structure of musical composition data 146.

Next, data relating to the hand-held apparatus 40 will be described. Data stored in the leader apparatus, among all the hand-held apparatuses 40, will be described first. FIG. 18 is a diagram showing a memory map of the RAM 54, which is shown in FIG. 10, in the leader apparatus. As shown in FIG.

18, the RAM 54 includes a program storage area 140, a data storage area 144, and a work area 149.

The program storage area 140 has stored therein a game main program 141 and the like executed by the CPU core 51. The game main program 141 includes a cooperative playing processing program 142, a communication program 143, and the like. The cooperative playing processing program 142 is a program to display a screen as shown in FIG. 14, and to perform the cooperative music playing game according to the present embodiment. The communication program 143 is a program to perform communication with the stationary apparatus 3 during the cooperative music playing game. Although not shown, the game main program 141 has stored therein various programs necessary for the game process such as a cooperative playing processing program for a single-player play. Correspondence relations between the buttons and the sound scales (key map) as indicated on the above-described note header 107 are defined in the cooperative playing processing program 142.

In the data storage area 144, a communication data 145, musical composition data 146, image data 147, the low quality sound data 148 and the like are stored. The communication data 145 is used for connecting and communicating with the stationary apparatus 3.

The musical composition data 146 is data relating to a musical composition to be played cooperatively. FIG. 19 is a diagram showing an exemplary data structure of the musical composition data 146. The musical composition data 146 is composed of a group of a musical composition ID 161, a bibliographic data 162 and musical score data 163. The musical composition ID 161 is an ID for uniquely identifying respective musical compositions. The bibliographic data 162 is data relating to bibliographic information on respective musical compositions. For example, the bibliographic data 162 includes data such as a name of a musical composition, a name of an artist and the like. These pieces of bibliographic information are displayed on the musical composition selection screen (see FIG. 13).

Figures 20, 21:
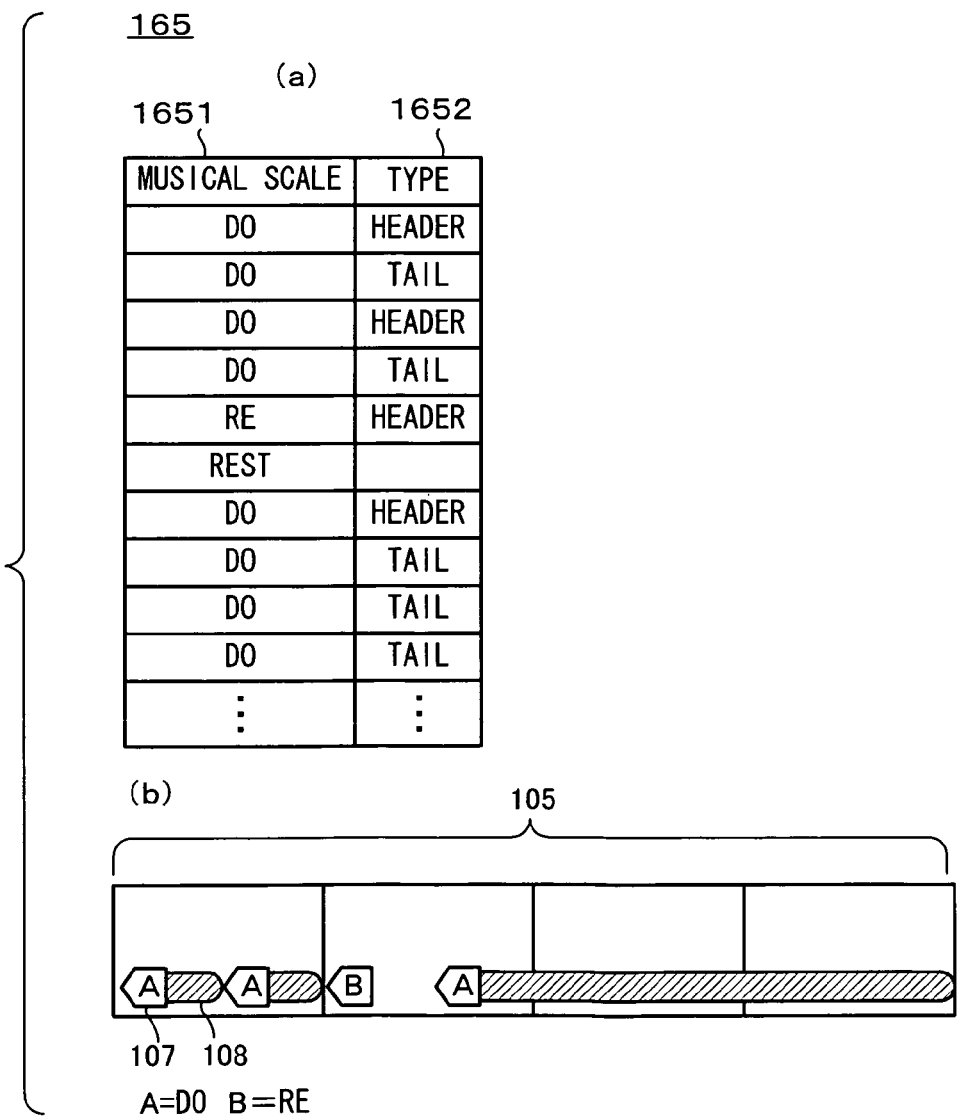
FIG. 20 is a diagram showing an exemplary data structure of musical score data 163.
FIG. 21 is a diagram showing a specific example of musical scale data 165.

The musical score data 163 is used when a player performs a play operation. FIG. 20 is a diagram showing an exemplary data structure of the musical score data 163. As shown in FIG. 20, the musical score data 163 is composed of a part 164, musical scale data 165, a tempo list 166 and a parameter list 167. The part 164 is data indicative of a musical instrument used to play the part. The musical scale data 165 represents a content of an operation performed by a player as well as a note of the part. That is, the musical scale data 165 stores therein data relating to the note header 107 and data relating to the note tail 108 shown FIG. 14 in chronological order.

FIG. 21 shows a specific example of the musical scale data 165. An exemplary data shown in FIG. 21(a) corresponds to displayed contents of the track 105 shown in FIG. 21(b). The musical scale data 165 is composed of a musical scale 1651 and a type 1652. The musical scale data 165 stores therein data of a musical score which is divided in sixteenth note units, and the sixteenth note is the minimum length of a sound in the present cooperative music playing game (1 record=data of sixteenth note). The musical scale 1651 indicates a sound pitch such as do, re and mi, and a rest. The type 1652 indicates either the note header 107 or the note tail 108.

With reference back to FIG. 20, the tempo list 166 is data indicative of a tempo of a musical composition. FIG. 22 is an exemplary data structure of the tempo list 166. The tempo list 166 is composed of a time 1661 and a tempo 1662. The time 1661 indicates a position in a musical composition and set the start of the musical composition as "0". The time 1661 is set so as to satisfy the length of the quarter note=12. The tempo 1662 indicates a tempo of the musical composition at the point indicated in the above-described time 1661. For example, the tempo is indicated by values ranging from 30 to 300.

With reference back to FIG. 20, the parameter list 167 indicates a parameter relating to a part to be played. As shown in FIG. 23, the parameter list 167 is composed of a time 1671 and a play parameter 1672. The time 1671 is the same as the time 1661 in the tempo list. The play parameter 1672 has stored therein a scale mode indicative of the number of sharps (#) and flats ( ) and data indicative of a volume. By using the play parameter 1672, the volume and the musical scale can be changed dynamically during playing.

With reference back to FIG. 18, the image data 147 indicates various images displayed on the game screen of the leader apparatus. The low quality sound data 148 is sound data to be outputted from the loudspeaker 60 of the leader apparatus. Since the low quality sound data 148 is processed on the hand-held apparatus, the sound quality is lower than the high quality sound data 124 stored in the stationary apparatus 3.

In the work area 149, scoring point data 150 indicative of the scoring point calculated based on the operation performed on the leader apparatus is stored.

Figure 24:
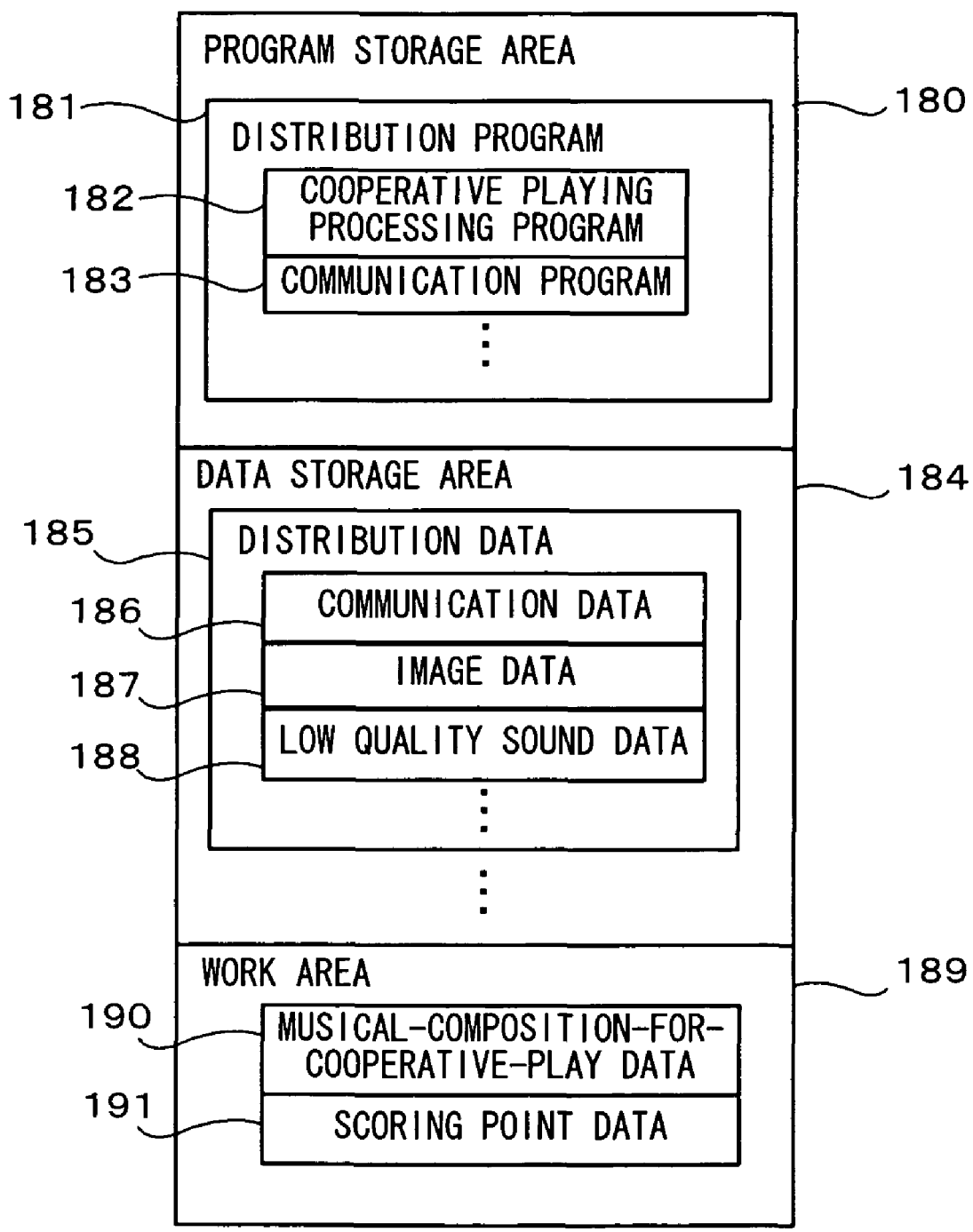
FIG. 24 is a diagram showing a memory map of a RAM 54 of a member apparatus.

Next, data stored in the member apparatus will be described. FIG. 24 is a diagram showing a memory map of the RAM 54 of the member apparatus. As shown in FIG. 24, the RAM 54 includes a program storage area 180, a data storage area 184, and a work area 189.

In the program storage area 180, a distribution program 181 transmitted from the stationary apparatus 3 is stored. The distribution program 181 includes a cooperative playing processing program 182, a communication program 183 and the like. The cooperative playing processing program 182 displays a screen as shown in FIG. 14, and executes the cooperative music playing game according to the present embodiment on the member apparatus. Therefore, a main function of the cooperative playing processing program 182 is the same as that of the cooperative playing processing program 142 in the leader apparatus. The communication program 183 performs communication with the stationary apparatus 3 during the cooperative music playing game. Although not shown, various program necessary for the game process is stored in the communication program 183.

In the data storage area 184, distribution data 185 transmitted from the stationary apparatus 3 is stored. The distribution data 185 has stored therein communication data 186, image data 187, low quality sound data 188 and the like. Since these pieces of data is the same as the communication data 145, the image data 147, and the low quality sound data 148 of the leader apparatus, description thereof will be omitted.

In the work area 189, musical-composition-for-cooperative-play data 190, scoring point data 191 and the like are stored. The musical-composition-for-cooperative-play data 190 corresponds to the musical-composition-for-cooperative-play data 129 which is in the stationary apparatus 3 and transmitted to the member apparatus. The scoring point data 191 indicates the scoring point calculated based on the operation performed on the member apparatus.

Figure 25:
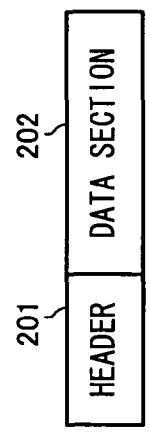
FIG. 25 is a diagram showing an exemplary structure of a communication packet according to certain example embodiments.

Next, a communication packet transmitted among the game apparatuses during the game process of the present embodiment will be described. FIG. 25 is a diagram showing an exemplary communication packet structure. As shown in FIG. 25, the communication packet is composed of a header 201 and a data section 202. The header 201 includes data relating to a port to be used for communication and a length of data of the data section 202 (that is, the length of the data section 202 is variable). The data section 202 includes various data used in the cooperative music playing game.

Figure 26:
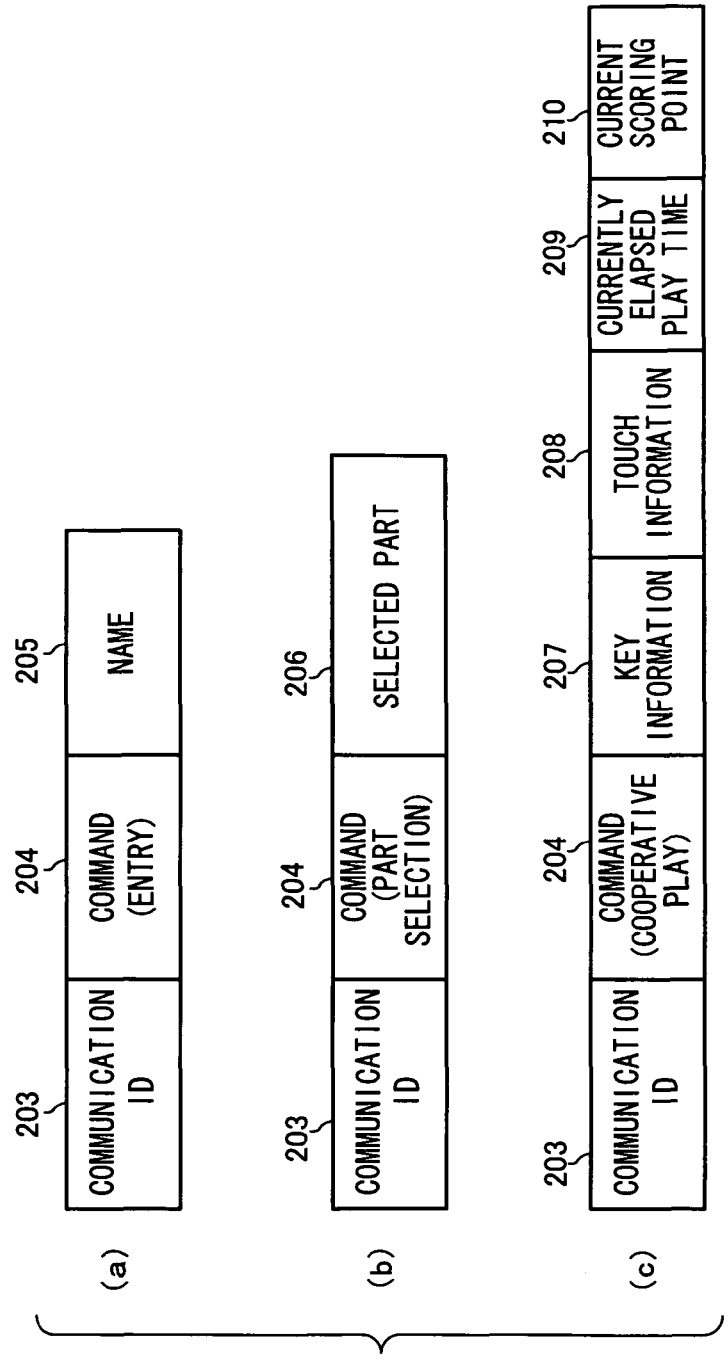
FIG. 26 is a diagram showing another exemplary structure of the communication packet according certain example embodiments.

FIG. 26 is a diagram showing an exemplary data section 202 in several aspects during the cooperative music playing game processing. FIG. 26(a) is an exemplary data section 202 transmitted from the hand-held apparatus 40 to the stationary apparatus 3 at the time of the entry processing. In the data section 202 shown in FIG. 26(a), a communication ID 203, an identification command 204 and a name 205 are set. As the communication ID 203, a communication ID assigned by the stationary apparatus 3 during the connection processing is set. The communication ID 203 is used to identify the communication relating to the present cooperative music playing game, among various pieces of communication exchanged between the stationary apparatus 3 and the hand-held apparatus 40. The identification command 204 indicates a type of data to be transmitted or types of commands without including data, and in this case, the type of data to the transmitted is a name of a player (indicated as "entry" in this case). As the name 205, the "name" inputted in the hand-held apparatuses 40 by each of the players is set.

FIG. 26(b) is an exemplary data section 202 transmitted from the hand-held apparatus 40 to the stationary apparatus 3 at the time of part selection processing. In FIG. 26(b), the communication ID 203, the identification command 204, and the selection part 206, which are the same as those shown in FIG. 26(a), are set. As the identification command 204, data indicating that the selected part is to be transmitted is set (in this case, "part selection" is displayed). As the selected part 206, information indicative of a part selected by the player is set.

FIG. 26(c) is an exemplary data section 202 transmitted from the hand-held apparatus 40 to the stationary apparatus 3 at the interval of 1/60 sec. (1 frame) during the cooperative playing processing. In FIG. 26(c), in addition to the communication ID 203 and the identification command 204 which are the same as those shown in FIG. 26(a), key information 207, touch information 208, a currently elapsed play time 209, a current scoring point 210 are set. As the identification command 204 shown in FIG. 26(c), data indicating that the operation data during the cooperative play is to be transmitted is set (in this case, the "cooperative play" is displayed). As the key information, information relating to whether or not the button operation is performed in the hand-held apparatus 40, and information relating to a button having been operated are set. As the touch information, information relating to whether or not the touch panel 45 is touched and information relating to a coordinate point having been touched are set. As the currently elapsed play time 209, an elapsed time of a musical composition being played at a time point when the packet is transmitted is set. That is, the currently elapsed play time 209 indicates a position of the musical composition at the time point when the packet is transmitted, and can be used for determining a timing when the player has pressed a button, for example. As the current scoring point 210, a scoring point of the player at the time point when the packet is transmitted is set.

Hereinafter, with reference to FIGS. 27 to 31, an operation of the cooperative music playing game process according to the present embodiment will be described in detail. FIG. 27 is a diagram showing, in detail, a flow of the cooperative music playing game process according to the present embodiment. Hereinafter, it is assumed that processing on the member apparatus side is performed in each of a plurality of the member apparatuses.

First, the connection processing of step S1 shown in FIG. 11 will be described in detail. A game is started up in the stationary apparatus 3 (step S21). Specifically, when the stationary apparatus 3 is turned on, the CPU 10 of the stationary apparatus 3 executes a start-up program stored in the ROM/RTC 13, and respective units such as the external main memory 12 is initialized accordingly. The cooperative music playing game program stored in the flash memory 17 is read into the external main memory 12, and CPU 10 starts executing the cooperative music playing game program.

In the leader apparatus as well, the cooperative music playing game is started up (step S11). Specifically, when the leader apparatus is turned on, the CPU core 51 of the leader apparatus executes a start-up program stored in a boot ROM (not shown), and initiates respective units such as the RAM 54, accordingly. The packaged cooperative music playing game program stored in the memory card 47 is read into the RAM 54, and the game program is caused to be executed. As a result, a game image is displayed on the first LCD 41 via the first GPU 56, and on the second LCD 42 via the second GPU 57, whereby a game process is started. The player thereafter performs an operation to select the game mode for the multiple-player play, and then performs an operation to cause the leader apparatus to be connected to the stationary apparatus 3.

On the other hand, each of the member apparatuses has no memory card 47 inserted therein. Therefore, in each of the member apparatuses, the download mode is started up (step S31) so as to download the game program (distribution program 122) from the stationary apparatus 3. For example, when the hand-held apparatus 40 is turned on while not having memory card 47 inserted therein, a start-up menu is displayed. The download mode is then started up by selecting the download mode from the menu. The member apparatus may be configured such that the start-up menu is displayable without starting up a game of the memory card 47 even if the memory card 47 is inserted therein. For example, the member apparatus may be configured so as to display the start-up menu when the hand-held apparatus 40 is turned on while the start switch 44b is being pressed.

Figure 28:
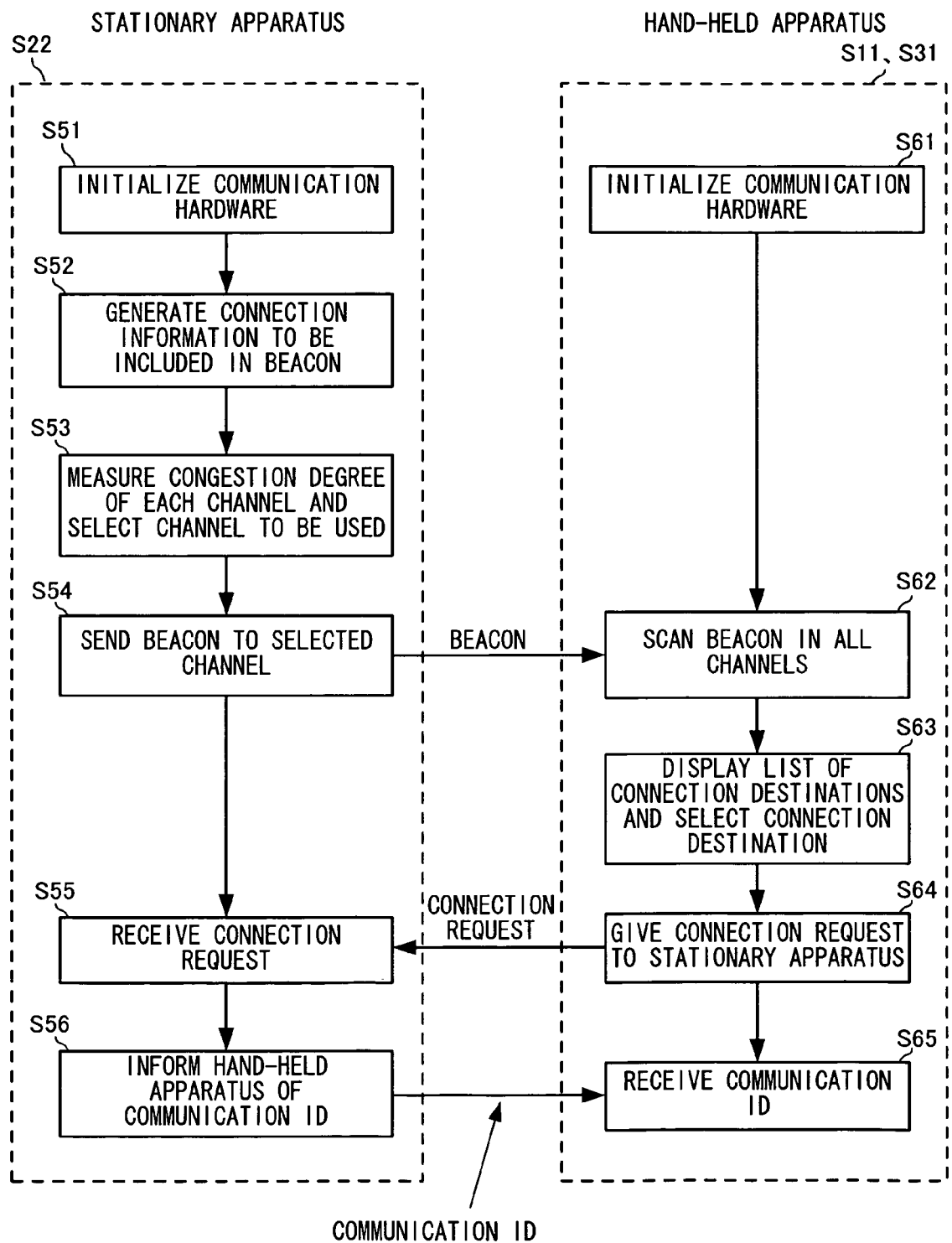
FIG. 28 is a flowchart showing, in detail, processing for establishing connection.

Next, the processing for establishing connection is performed (steps S12, S22, and S32). FIG. 28 is a flowchart showing, in detail, the processing for establishing connection performed between the stationary apparatus 3 and the hand-held apparatuses 40 (a common processing is performed in both of the leader apparatus and the member apparatus). A flow on the stationary apparatus 3 side (on the left side) shown in FIG. 28 is equivalent to processing of step S22 shown in FIG. 27. Further, a flow on the hand-held apparatus side (on the right side) shown in FIG. 28 is equivalent to processing of steps S12 and S32 shown in FIG. 27.

As shown in FIG. 28, in the stationary apparatus 3, communication hardware is initialized (step S51). In a similar manner, communication hardware is initialized in the hand-held apparatus 40 (step S61). Thereafter, in the hand-held apparatus 40, the processing proceeds to step S62 described later, and processing for scanning a beacon is started.

Subsequently, in the stationary apparatus 3, the CPU 10 prepares for sending out the beacon. The beacon is a signal which causes the hand-held apparatus 40 to recognize the existence of the stationary apparatus 3, and to attempt to establish a connection therewith. The beacon includes information necessary for connection (hereinafter referred to as connection information) such as a network address of the stationary apparatus 3 and a game ID. Accordingly, the CPU 10 first executes processing for generating the connection information to be included in the beacon (step S52).

Subsequently, in the stationary apparatus 3, a channel to be used for the communication is selected (step S53). Specifically, the CPU 10 measures congestion degrees of respective channels, and selects a channel having a lowest congestion degree (emptiest channel) as a channel to be used for the communication of the cooperative music playing game of the present embodiment.

Subsequently, the CPU 10 sends the beacon including the above-described connection information to the channel to be used which has been selected in step S53 (step S54). At the same time, the CPU 10 waits for a connection request signal from the hand-held apparatus 40.

While the beacon is sent out from the stationary apparatus 3, the beacon is scanned in all the channels of the hand-held apparatus 40 (step S62). The beacon which is detected is received. The CPU core 51 then obtains the connection information included in the beacon. As a result, the network address of the stationary apparatus 3, which is source of the beacon, and the game ID can be obtained.

Subsequently, in the hand-held apparatus 40, the CPU core 51 displays a list of connection destinations, in accordance with the above-described connection information, so as to cause the player to select a connection destination (step S63). In the present embodiment, since the number of the stationary apparatus 3 which is a source of the beacon is only one, only the stationary apparatus 3 is displayed on the list. If a plurality of the stationary apparatuses 3 is detected, the plurality of stationary apparatuses 3 is displayed in the list.

Subsequently, the CPU core 51 transmits the connection request signal to the stationary apparatus 3 in accordance with the connection information of the selected connection destination (step S64). The connection request signal includes a network address of each of the hand-held apparatuses and information for identifying either the leader apparatus or the member apparatus. In accordance with the transmission of the signal, processing for receiving the connection request is performed in the stationary apparatus 3 (step S55). Subsequently, in stationary apparatus 3, the CPU 10 assigns the communication ID to each of the hand-held apparatuses 40 which has transmitted the connection request to the stationary apparatus 3. The CPU 10 then notifies each of the hand-held apparatuses of the communication ID (step S56).

In the hand-held apparatus 40, the CPU core 51 receives the notified communication ID, and stores the same in the RAM 54 (step S65). Thereafter, communication is performed by using the communication ID. Here ends the processing for establishing connection.

With reference back to FIG. 27, when the connection processing is completed, the preparation processing (step S2) is performed. As above described, in the preparation processing, generally four types of processing is performed i.e., (1) the processing for downloading the distribution program, (2) the entry processing, (3) musical composition selection processing, and (4) part selection processing. First, the processing for downloading the distribution program (1) is performed. That is, in the stationary apparatus 3, processing for transmitting the distribution program is performed. Specifically, the CPU 10 reads the distribution program 122 and the distribution data 127 from the external main memory 12, and divides the same into several pieces of communication packets, respectively. The CPU 10 transmits the packetized distribution program 122 and distribution data 127 to each of the member apparatuses with which connections have been established (step S23).

In the hand-held apparatus 40, the packetized distribution program 122 and distribution data 127 are received and reassembled, whereby the distribution program and the distribution data are downloaded (step S33). When the downloading is completed, a reception complete signal for indicating that the downloading is completed is transmitted from the hand-held apparatus 40 to the stationary apparatus 3. The stationary apparatus 3 receives the reception complete signal, and the reception complete signal is transmitted to the leader apparatus. Subsequently, in the hand-held apparatus 40, the received distribution program and the distribution data are stored in the RAM 54, and the distribution program is started up (step S34).

Next, the entry processing (2) is performed. The processing determines a member to enter the cooperative play. Specifically, in the stationary apparatus 3 and the leader apparatus, the entry processing is performed upon reception of the reception complete signal (steps S13 and S24). In the member apparatus, the entry processing is performed subsequent to step S34 (step S35). In the processing, the CPU core 51 displays a screen urging the player to input a name of the player. The players holding the leader apparatus and the member apparatus input their names or nicknames in their own hand-held apparatuses 40. Each of the players performs an operation so as to transmit the name or the nickname to the stationary apparatus 3. Based on this operation, the communication packet as shown in FIG. 26(*a*) is generated in each of the hand-held apparatus 40, and is transmitted to the stationary apparatus 3.

In the stationary apparatus 3, a screen indicative of the number of the players having been entered is displayed. The stationary apparatus 3 then waits for the names and the nicknames (the packet shown in FIG. 26(*a*)) to be transmitted from the leader apparatus and the member apparatus. When the names and the nicknames have been transmitted to the stationary apparatus 3, the display relating the number of players having been entered is updated as appropriate. When all the players have completed their entries to the game, any player presses a "confirm" button displayed on the television 2 (such that the player informs the stationary apparatus 3 that the entry has been completed) by using the controller 7. Accordingly, an entry complete signal is transmitted from the stationary apparatus 3 to each of the hand-held apparatuses 40 and then the entry processing is completed.

Next, the musical composition selection processing (3) is performed. In the processing, a musical composition to be played is selected by using the leader apparatus, and then performed is processing for distributing data of the musical composition to the stationary apparatus 3 and the remaining hand-held apparatuses 40. In the leader apparatus, after the entry complete signal is received, the musical composition selection processing is performed (step S14). Specifically, the CPU core 51 of the leader apparatus obtains the musical composition data 146. The CPU core 51 then generates a list of musical compositions in accordance with the bibliographic data 162, and displays the list on the first LCD 41.

The player holding the leader apparatus performs an operation to select a desired musical composition from the displayed list of the musical compositions. In accordance with the operation, the CPU core 51 obtains the bibliographic data 162 and the musical score data 163 of the selected musical composition, and transmits the same to the stationary apparatus 3 (step S15). The CPU core 51 performs a display indicating that the musical composition is being distributed, and waits for a musical composition distribution complete signal to be transmitted.

In the stationary apparatus 3, when the bibliographic data 162 and the musical score data 163 are transmitted from the leader apparatus, the CPU 10 receives the data, and stores the data as the musical-composition-for-cooperative-play data 129 in the work area 128 (step S25). The CPU 10 then performs processing for distributing the musical-composition-for-cooperative-play data 129 to the member apparatuses (step S26).

When the distribution of the musical-composition-for-cooperative-play data 129 from the stationary apparatus 3 is started, the CPU core 51 of each of the member apparatuses receives the musical-composition-for-cooperative-play data 129, and stores the same as the musical-composition-for-cooperative-play data 190 in the work area 189 (step S36). When reception of the musical-composition-for-cooperative-play data is completed, the CPU core 51 transmits a reception complete signal indicating that the reception is completed to the stationary apparatus 3.

In the stationary apparatus 3, when the reception complete signal is received from each of the member apparatuses, a musical composition distribution complete signal indicating that distribution of the musical composition data is completed is transmitted to the leader apparatus and each of the member apparatuses. Here ends the musical composition selection processing.

Next, the part selection processing (4) is performed. In the processing, a part selection screen as shown in FIG. 13 is displayed. Each of the players performs an operation for part selection by using the hand-held apparatus 40 held by the player. When the selection operation is performed with the hand-held apparatus, the packet as shown in FIG. 26(*b*) is generated, and then transmitted to the stationary apparatus 3. The stationary apparatus 3 receives the packet. Based on the received packet, the CPU 10 generates information on correspondence relation between the respective hand-held apparatuses 40 and respective parts to be taken charge by the respective hand-held apparatuses 40, and then stores the information in the work area 128. The CPU 10 then generates a selection-done signal indicative of parts having been selected, and transmits the same to each of the hand-held apparatuses 40. Each of the hand-held apparatuses 40 constantly receives the selection-done signal, and reflects the signal in the part selection screen. When all the players have determined their parts, the stationary apparatus 3 transmits a part selection complete signal to each of the hand-held apparatuses 40.

Figure 29:
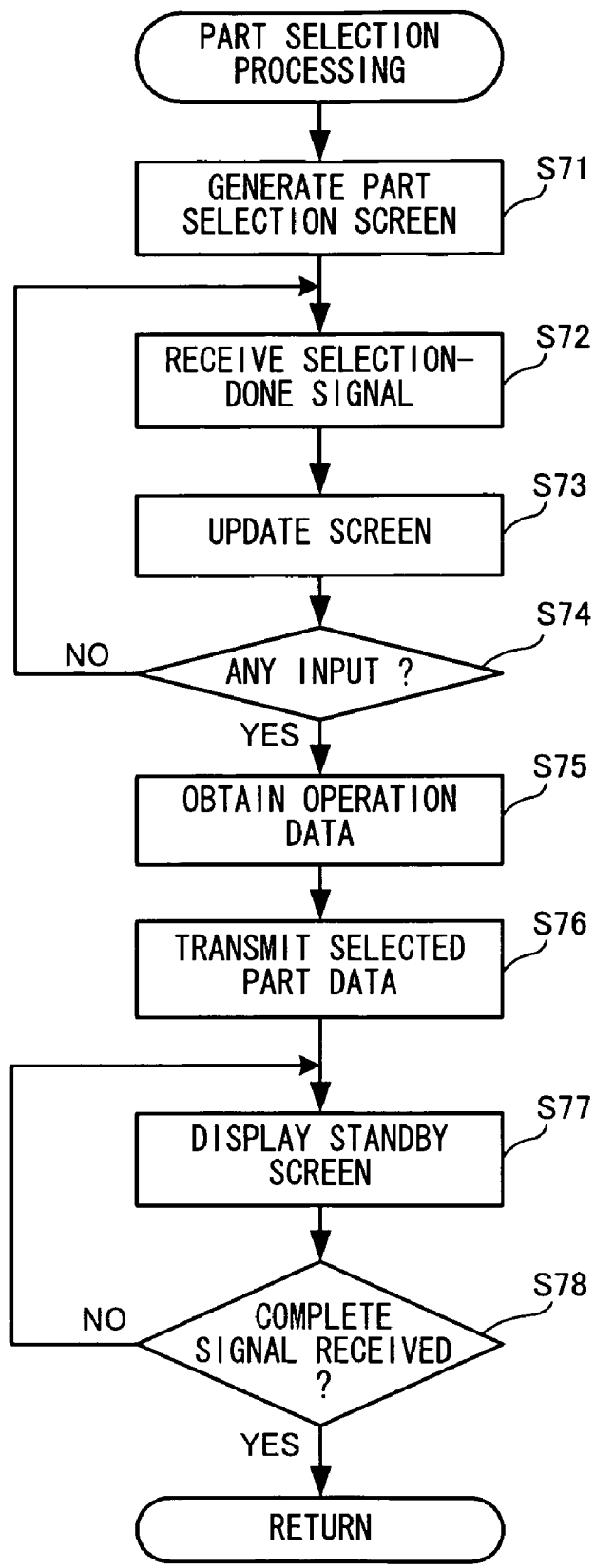
FIG. 29 is a flowchart showing, in detail, part selection processing.

FIG. 29 is a flowchart showing, in detail, the part selection processing performed in the leader apparatus and each of the member apparatuses. As shown in FIG. 29, the CPU core 51 of each of the leader apparatus and the member apparatuses generates and displays the part selection screen as shown in FIG. 13, in accordance with the musical score data 163 (or the musical score data included in the musical-composition-for-cooperative-play data 190 in the case of the member apparatus) (step S71). The CPU core 51 then determines whether or not the selection-done signal has been transmitted from the stationary apparatus 3. As a result, when the signal has been transmitted, the CPU core 51 performs processing so as to receive the signal (step S72). The selection-done signal indicates a part having been selected by another player.

The CPU core 51 then reflects the selection-done signal in the screen as appropriate, and updates the screen (step S73). Accordingly, a part selection state of another player is constantly reflected in the screen of each of the hand-held apparatuses 40.

The CPU core 51 then determines whether or not the selection operation has been performed by the player (step S74). When the selection operation has not been performed, the processing is repeated after returning to step S72. When the selection operation has been performed (YES in step S74), the CPU core 51 obtains operation data indicative of a content of the operation performed by the player, and determines which of the parts has been selected by the player (step S75).

The CPU core 51 then generates the communication packet as shown in FIG. 26(*b*) in accordance with the operation data, and transmits the same to the stationary apparatus 3 (step S76). As above described, the stationary apparatus 3 receives the communication packet. Based on the packet, the above-described selection-done signal is generated in the stationary apparatus 3, and is then transmitted to each of the hand-held apparatuses.

The CPU core 51 displays a standby screen indicative of being on standby until all the players complete the part selection (step S77). The CPU core 51 then determines whether or not the part selection complete signal has been transmitted from the stationary apparatus 3 (step S78). When the part selection complete signal has not been transmitted (NO in step S78), the CPU core 51 waits until the part selection completion signal is transmitted. When the part selection complete signal is transmitted (YES in step S78), the CPU core 51 receives the signal, and the part selection processing is completed. Here ends the description of the preparation processing.

Figure 30:
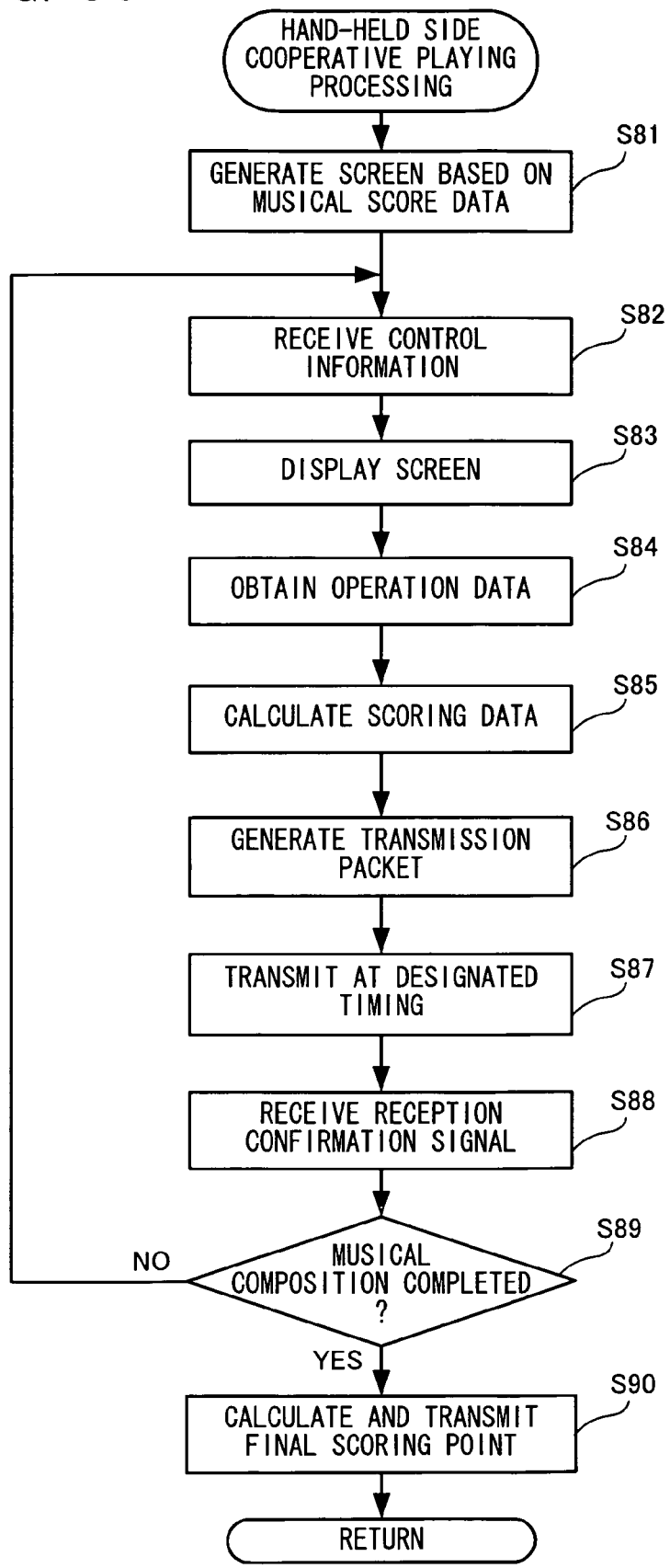
FIG. 30 is a flowchart showing, in detail, hand-held-apparatus-side cooperative playing processing executed by respective hand-held game apparatuses 40.

With reference back to FIG. 27, when the preparation processing is completed, the cooperative playing processing is performed while the respective game apparatuses are synchronized with one another (steps S17, S28 and S38). First, the cooperative playing processing (steps S17 and S38) on the hand-held apparatus 40 side will be described. FIG. 30 is a flowchart showing, in detail, hand-held side cooperative playing processing performed on each of the hand-held apparatuses 40. As shown in FIG. 30, the CPU core 51 generates a cooperative playing screen as shown in FIG. 14, in accordance with the musical score data 163 (the musical-composition-for-cooperative-play data 190 in the case of the member apparatus) (step S81).

The CPU core 51 then receives control information from the stationary apparatus 3 (step S82). The control information includes information for synchronization in a game progress between the stationary apparatus 3 and each of the hand-held apparatuses 40. The control information also includes information indicative of a timing of transmitting the operation data from each of the hand-held apparatuses 40 to the stationary apparatus 3. In the present cooperative music playing game, even if the operation data is transmitted simultaneously from a plurality of the hand-held apparatuses 40 to one stationary apparatus 3 as necessary, the stationary apparatus 3 may not be able to receive the operation data simultaneously, or may fail in receiving some pieces of the operation data. Therefore, a slight time lag is set in the timing of transmitting the operation data from each of the hand-held apparatuses 40.

The CPU core 51 then displays a game screen (step S83). In accordance with the information for synchronization in the game progress which is included in the control information, the CPU core 51 adjusts and then displays a content of the screen (such as a display position of the cursor 110) to be displayed as appropriate.

The CPU core 51 obtains the operation data (step S84). That is, the CPU core 51 determines whether or not any of the buttons such as the cross key 44*a* is pressed, and detects which button has been pressed when any button is determined to have been pressed. Further, the CPU core 51 also determines whether or not the touch panel 45 is touched, and obtains the touch coordinate point when the touch panel is determined to have been touched.

In accordance with the operation data obtained in step S84, the CPU core 51 performs scoring point calculation processing (step S85). That is, the CPU core 51 compares a content of an operation indicated by the operation data to the musical scale data 165, and determines whether or not a correct button is operated. The CPU core 51 also calculates, for example, the time lag between a timing when a button has been operated and an appropriate timing. For example, the CPU core 51 determines whether the type 1652 of the musical scale data 165, at a timing when any button is pressed, is the "header" or the "tail", and when the type 1652 is determined to be the "tail", the CPU core 51 calculates a degree of the time lag between the timing when the button is pressed in the "tail" and the "header". In accordance with a result of the above-described comparison, the CPU core 51 calculates a scoring point. The closer the time lag between the musical scale data 165 and the operation content indicated by the operation data is, the higher the scoring point becomes.

Immediately after the completion of the above-described scoring point calculation processing, a sound of each of the parts may be outputted from each of the hand-held apparatuses 40 in accordance with the low quality sound data 148 and 188.

The scoring point calculation processing may be performed on the stationary apparatus 3. However, in the music game, a time lag in pressing the button is characteristically reflected in the scoring point. If the operation data is transmitted to the stationary apparatus such that the scoring point calculation is performed on the stationary apparatus, an overhead will be caused by the data transmission processing, and consequently, the timing when the button is pressed cannot be recognized accurately on the stationary apparatus 3 side. Accordingly accurate scoring point calculation may not be able to be performed. Therefore, as above described, the scoring point calculation processing is performed on each of the hand-held apparatuses 40.

In accordance with the operation data obtained in step S84, the CPU core 51 generates the communication packet as shown in FIG. 26(*c*) (step S86). That is, the information relating to whether or not any button is pressed (when none of the buttons are pressed, a message indicating "no operation" is transmitted) and the information indicating which of the buttons has been pressed are set as the key information 207. In a similar manner, information relating to whether or not the touch panel 45 is touched and information on the touch coordinate point are set as the touch information 208. Further, the currently elapsed play time 209 and the current scoring point 210 are also set as appropriate.

In accordance with the transmission timing indicated by the control information received in step S82, the CPU core 51 transmits the communication packet generated in step S86 to the stationary apparatus 3 (step S87).

The CPU core 51 then receives a reception confirmation signal transmitted from the stationary apparatus 3 (step S88). The CPU core 51 determines whether or not the musical composition currently played is completed (step S89). When the musical composition is yet to be completed (NO in step S89), the processing is repeated after returning to step S82. When the musical composition is completed (YES in step S89), the CPU core 51 calculates a final scoring point and transmits the same to the stationary apparatus (step S90). The cooperative playing processing at the hand-held side is then completed.

Figure 31:
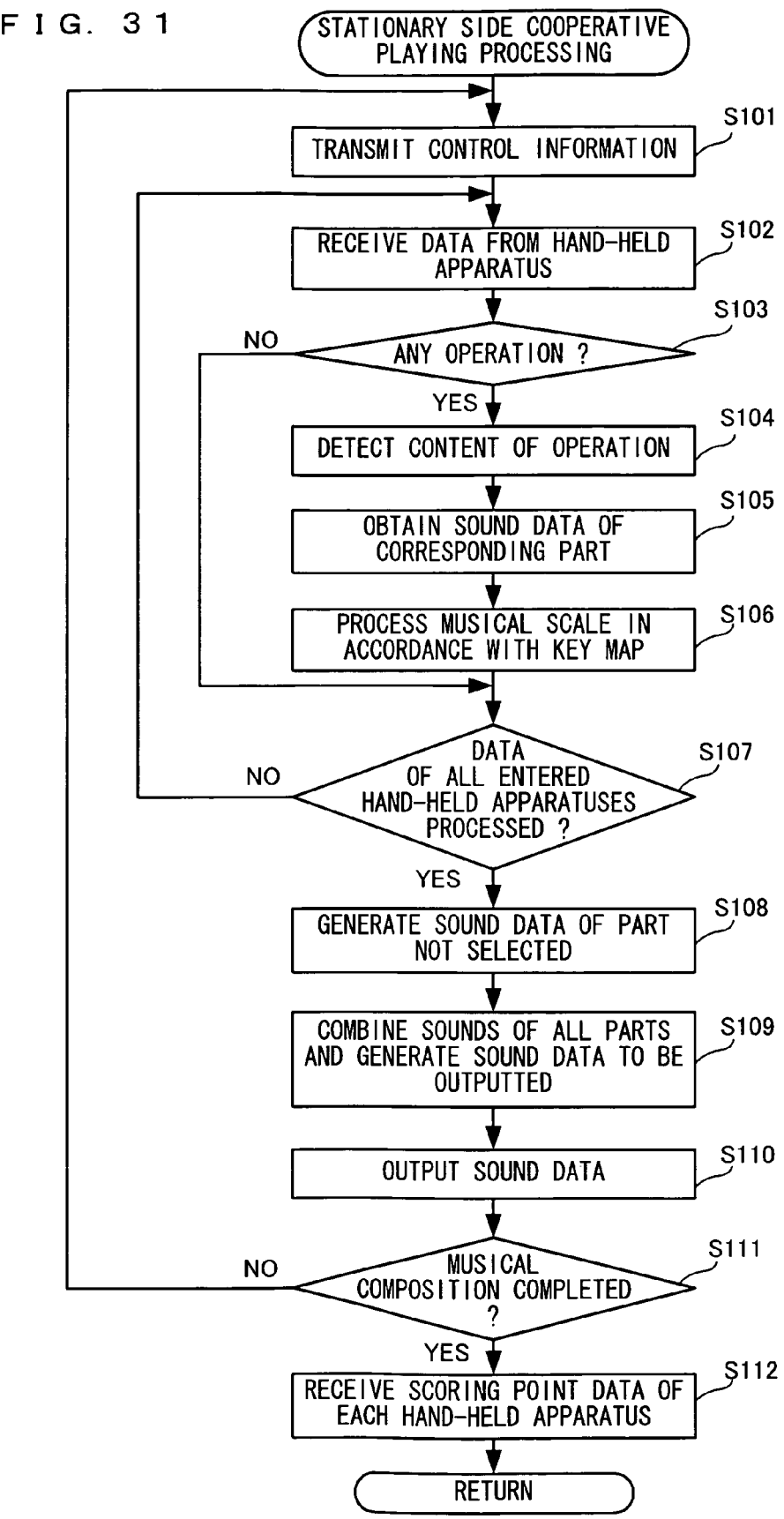
FIG. 31 is a flowchart showing, in detail, stationary-apparatus-side cooperative playing processing executed by a stationary game apparatus 3.
Figure 32:
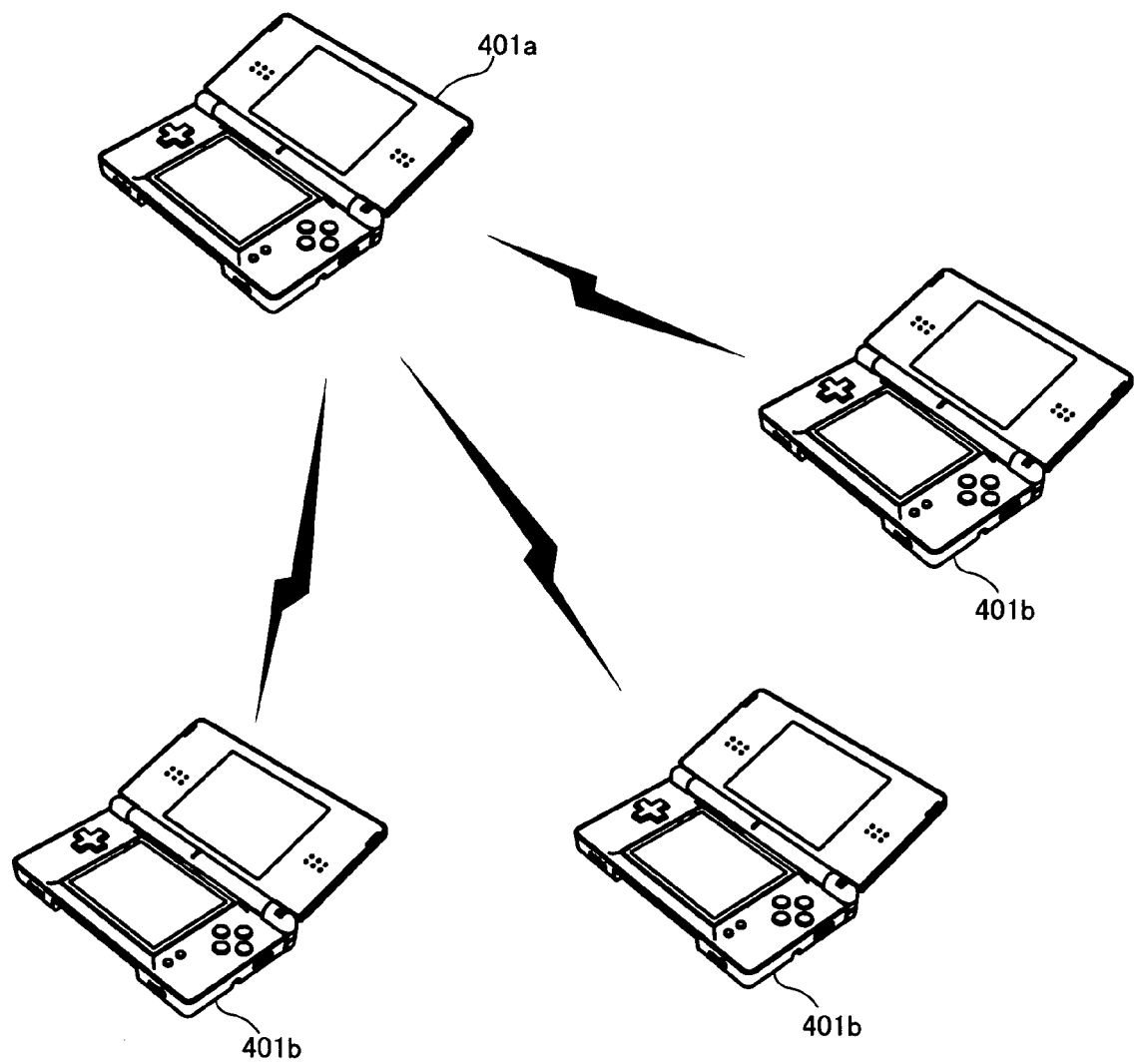
FIG. 32 is a diagram showing a system configuration for playing a conventional cooperative music playing game.

Next, the cooperative playing processing on the stationary apparatus 3 side will be described. FIG. 31 is a flowchart showing, in detail, stationary-side cooperative playing processing performed on the stationary apparatus 3. As shown in FIG. 31, when the cooperative play is started, the CPU 10 of the stationary apparatus 3 transmits the above-described control signal to each of the hand-held apparatuses 40 (step S101).

In accordance with the control information, the CPU 10 receives the communication packet (the packet shown in FIG. 26(*c*)) from any of the hand-held apparatuses 40 (step S102).

In accordance with a content (the key information and the touch information 208) of the received packet, the CPU 10 determines whether or not any operation is performed on the hand-held apparatus 40, which is a transmission source (step S103). When no operation is performed on the hand-held apparatus 40 of the transmission source (NO in step S103), the processing proceeds to step S107 described later. On the other hand, when any operation is performed (YES in step S103), the CPU 10 detects a content of the operation (step S104).

The CPU 10 then obtains the high quality sound data 124 of a part of a musical instrument taken charge by the hand-held apparatus 40 of the transmission source (step S105). Subsequently, the CPU 10 processes the obtained high quality sound data 124 in accordance with the above-described key map (defining correspondence relation between the buttons and the musical scales) so as to create a musical scale corresponding to the content of the operation detected in step S104 (step S106). For example, if the musical scale of the obtained high quality sound data 124 is "do", the musical scale is processed into "mi" or "so" in accordance with the content of the operation.

The CPU 10 determines whether or not the operation data of all the hand-held apparatuses 40 entering the cooperative play has been processed or not. When the operation data of all the hand-held apparatuses 40 is yet to be processed (NO in step S107), the CPU 10 returns to the processing of step 102, and repeats the processing of steps S102 to S107 with respect those hand-held apparatuses 40 whose operation data is yet to be processed.

On the other hand, when the processing is completed with respect to all the hand-held apparatuses 40 (YES in step S107), the CPU 10 then generates the sound data of a part, which is not selected in the above-described part selection processing, in accordance with the musical-composition-for-cooperative-play data 129 (step S108). That is, a part which is not taken charge by any player is played by the stationary apparatus 3 automatically.

The CPU 10 then combines the sound data of all the parts and generates the sound data to be outputted (step S109). That is, the CPU 10 generates sound data in a cooperative play state.

The CPU 10 outputs the sound data generated in step S109 from the loudspeaker 2*a* (step S110).

The CPU 10 determines whether or not the musical composition currently played cooperatively is completed (step S111). When the musical composition is yet to be completed (NO in step S111), the CPU 10 returns to step S101, and repeats the processing. When the musical composition is completed (YES in step S111), the CPU 10 receives the final scoring point data transmitted from each of the hand-held apparatuses 40, and stores the data in the scoring point data 130 (step S112). The cooperative playing processing on the stationary apparatus 3 side is then completed.

With reference back to FIG. 27, when the cooperative playing processing is completed, result display processing is performed on the stationary apparatus 3 (step S29). In the processing, the screen as shown in FIG. 15 is generated, and displayed on the television 2. That is, the scoring points of all the players are displayed on the television 2 all together. The cooperative music playing game process according to the present embodiment is then completed.

In this manner, in the present embodiment, the operation data of each of the hand-held apparatuses 40 is transmitted to the stationary apparatus 3, and in the stationary apparatus 3, in accordance with the operation data, the sound data is generated and then outputted. Accordingly, it is possible to reduce a time lag from when each of the players operates each of the hand-held apparatuses 40 to when the sound (sound in a concert state), which reflects the operation of each of the players, is outputted, and thus it is possible to enable the players to enjoy a comfortable cooperative play without having a lag in the sound. Therefore, each player can feel the sense of togetherness more strongly by playing cooperatively with a plurality of players, and amusingness of the cooperative music playing game is also enhanced.

Further, in the present embodiment, processing relating to the sound is performed on the stationary apparatus 3 having mounted therein a CPU of higher performance than that mounted in the hand-held apparatus 40, and the sound output is also performed on the stationary apparatus 3. Accordingly, the sound processing using high quality sound data, which generally has a large data amount, can be performed without causing a lag in processing, and high quality sound can be outputted. Further, even in the case where the sound data is outputted after subjected to effect processing (such as reverb processing), advanced effect processing can be performed compared to the case where the effect processing is performed on the hand-held apparatus 40. Accordingly, a richer sound expression such as a more profound sound and a more extensive sound can be attained. As a result, amusingness of the cooperative music playing game can be further enhanced.

In the above-described embodiment, the software introduced in the stationary apparatus 3 is configured so as to store therein sound data of musical instruments only. The data (musical score data) of the musical composition to be actually played cooperatively is stored in the memory card 47, and the data is transmitted from the leader apparatus to the stationary apparatus 3, and then distributed from the stationary apparatus 3 to the remaining hand-held apparatuses 40. Accordingly, a volume of the software to be introduced in the stationary apparatus 3 can be reduced. Further, by adding the memory card 47 having stored therein new musical composition data, the number of musical compositions available for the cooperative play can be increased on an ex-post basis, and thus a highly extensible cooperative music playing game system can be provided. Accordingly, it is possible to provide a cooperative music playing game which never bores the player.

In the above-described musical composition selection processing, the musical composition data is transmitted from the leader apparatus to the stationary apparatus 3, and then transmitted from stationary apparatus 3 to the member apparatuses only. In addition to this, the musical composition data, which is transmitted from the leader apparatus, may be transmitted from the stationary apparatus 3 to the leader apparatus. That is, in the processing for distributing the musical composition data performed on the stationary apparatus 3, the musical composition data may be distributed to all the hand-held apparatuses 40 which are connected to the stationary apparatus 3, regardless of either the leader apparatus or the member apparatuses. Accordingly, it becomes unnecessary to perform, on the stationary apparatus 3, processing for selecting the member apparatuses as the distribution destination, whereby a processing load on the stationary apparatus 3 can be reduced.

In the above-described embodiment, part selection in the part selection processing is performed on a first-come-first-served basis, and all the players take charge of different parts. Instead of this, it may be possible to allow several players to select a common part.

In addition to the above-described cooperative playing processing using the stationary apparatus 3, it may be possible to have a configuration in which the cooperative playing processing can be performed among the hand-held apparatuses 40, as is performed conventionally, and any of the play modes is selectable by using the leader apparatus. Note that in the case of the cooperative playing processing among the hand-held apparatuses 40, the low quality sound data is used. With this configuration, it is possible to extend a range of choices for the players in play styles of the cooperative music playing game.

In the above-described embodiment, the note tail and the note header are displayed on the screen of each of the hand-held apparatuses so as to cause each of the players to play in accordance with a content of a display. Instead of having the note header and the like displayed on the screen of each of the hand-held apparatuses, it may be possible to have a configuration in which only an operation guidance (e.g., a display indicating A button="do" and B button="re") indicating correspondence relation between the buttons and the sound scales is displayed so as to allow each of the player to play freely. Accordingly, it is possible to allow the players to perform the cooperative play impromptu (impromptu play) while using the high quality sound output from the stationary apparatus 3.

While the above embodiments have been described in detail, the foregoing description is in all aspects illustrative and not restrictive. It is understood that numerous other modifications and variations can be devised without departing from the scope of the invention.

The invention claimed is:

1. A game system configured to execute a game, the system comprising:
    a plurality of hand-held game apparatuses, each one of the hand-held game apparatuses comprising:
        a user input device configured to accept user input;
        a display configured to display a plurality of directional signs that correspond to the accepted user input; and
    a stationary game apparatus comprising:
        a storage medium configured to store a plurality of operation sound data pieces;
        at least one processor configured to:
            load, from the storage medium, at least one of the plurality of operation sound data pieces that corresponds to accepted user input from at least one of the plurality of hand-held game apparatuses; and
            output a sound signal based at least in part on the loaded at least one of the plurality of operation sound data pieces,
    wherein each one of the plurality of hand-held game apparatuses are further configured to communicate data with the stationary game apparatus, the communicated data including data related to the accepted user input,
    wherein the user input device includes a touch panel.

2. The game system according to claim 1, wherein
    the game is a music game in which a musical composition includes a plurality of parts, and each one of the plurality of parts is associated with one of the hand-held game apparatuses,
    the plurality of directional signs indicate a content of a play operation of the musical composition with respect to each of the plurality of parts, each of the hand-held game apparatuses further comprises
   a data storage unit configured to store, in a chronological
     order, data indicative of the plurality of directional signs,
the display is further configured to display the plurality of
   directional signs that related to the part taken charge of
   thereby,
the plurality of operation sound data pieces correspond to
   each of the plurality of parts, and
the outputted sound signal corresponds at least in part to a
   part taken charge of by a hand-held game apparatus
   which is related to the operation sound data.

3. The game system according to claim 2, wherein
the selected part is included in the user input and the communicated data includes data related to the selected part,
the stationary game apparatus further comprises:
   a communication device configured to receive the selection data from the plurality of hand-held game apparatuses,
   wherein the communication device is further configured to transmit all pieces of the received selection data to each of the hand-held game apparatuses.

4. The game system according to claim 3, wherein the at least one processor is further configured to reproduce, without user input, a part of the musical composition, among the plurality of parts constituting the musical composition, which has not been selected.

5. The game system according to claim 1, wherein the at least one processor is further configured to change the musical scale of the sound to a predetermined musical scale.

6. The game system according to claim 1 wherein
the user input device includes a depressible key, and
the user input includes an operation of the depressible key.

7. The game system according to claim 1 wherein
the user input includes a touch coordinate point on the touch panel.

8. The game system according to claim 2, wherein
the data storage unit is further configured to store lower quality sound data than sound data stored in the stationary apparatus;
the plurality of hand-held game apparatuses are each configured to communicate with each other; each one of the plurality of hand-held game apparatuses includes a processing system configured to execute the game based on communications with the other hand-held game apparatuses and the lower quality sound data; and
wherein the user input device is further configured to accept a game mode selection that selects either of a handheld game mode in which the music game is performed while communication is performed among the hand-held game apparatuses or a stationary game mode in which the music game is performed through communication with the stationary game apparatus.

9. The game system according to claim 2, wherein
the data storage unit is further configured to store data indicative of the plurality of directional signs as musical composition data; and
the plurality of hand-held game apparatuses are further configured to transmit the musical composition data to the stationary game apparatus,
the stationary game apparatus further comprises:
   a communication device configured to receive the musical composition data and configured to transmit the received musical composition data to the hand-held game apparatuses,
wherein the data storage unit is further configured to store data indicative of the plurality of directional signs included in the musical composition data.

10. The game system according to claim 9, wherein
each of the plurality of the hand-held game apparatuses is further configured to calculate a scoring point of a play operation performed by the player by comparing the musical composition data to user input, and transmit scoring data indicative of the scoring point to the stationary game apparatus
the communication device is further configured to receive the scoring data from the hand-held game apparatuses, and
wherein the stationary game apparatus is further configured to display information related to the receiving scoring data.

11. The game system according to claim 9, wherein
the stationary game apparatus is further configured to distribute a play operation program to at least some of the plurality of game apparatuses for allowing a play operation to be performed by using each of the hand-held game apparatuses, the data storage unit is configured to communicate with a detachable storage medium having stored therein 1) a game program for executing the music game, and 2) the musical composition data, and is configured to store the distributed play operation program,
wherein the one of the plurality of hand-held game apparatuses that accommodates the storage medium, is configured to transmit the musical composition data stored in the storage medium to the stationary game apparatus,
the communication device is further configured to transmit, to the at least some of the plurality of game apparatuses, the transmitted musical composition data,
wherein the at least one of the plurality of the hand-held game apparatuses is configured to execute the music game in accordance with the transmitted play operation program and the transmitted musical composition data, and
wherein the at least some of the plurality of game apparatuses are game apparatuses that are not accommodating the storage medium.

12. A computer system for processing data communicated from a plurality of portable computing devices that each include a user input device and at least one display screen, the at least one display screen set to display input queues to a user, the plurality of portable computing devices set to communicate with the host computer system by sending at least operational data to the host computer system, the system comprising:
   a storage medium that is configured to store sound data;
   a processing system that includes one or more processors, the processing system configured to:
      receive operational data from each one of the plurality of portable computing devices, the operational data from each one of the plurality of portable computing devices based on input from a user that is received, through the input device of respective portable computing device, in response to the displayed input queues;
      retrieve sound data from the storage medium that corresponds to each of the received operational data; and
      output audio based at least in part on the retrieved sound data, wherein the user input device includes a touch panel.

13. The system of claim 12, wherein each one of the plurality of portable computing devices is set to process different parts of a plurality of parts of a musical composition, and the input queues are directional signs that indicate how the respective part on a computing device of the plurality of portable computing devices is to played.

14. The system of claim 13, wherein a number of the plurality of parts is greater than the a number of the plurality of portable computing devices, and wherein the processing system is further configured to:
retrieve player-independent sound data for a part not processed by one of the plurality of portable computing devices,
wherein the output audio is further based on the retrieved player-independent sound data.

15. The system of claim 12, wherein the processing system is further configured to:
combine all of the retrieved sound data into a final output sound data,
wherein the output audio is based on the final output sound data.

16. The system of claim 12, wherein the processing system is further configured to:
receive a musical composition from at least one of the plurality of portable computing devices; and
distribute an operating program and the musical composition to at least some of the plurality of portable computing devices, wherein the at least some of the plurality of portable computing execute a program based on the operating program and the musical composition.

17. A host computing control method for processing input on a host computer system from a plurality of mobile computing devices that each include an input controller, at least one display screen, and at least one processor, the at least one display set to display input queues on the at least one display screen, the host computer system configured to communicate with the plurality of computing devices set, the method comprising:
storing sound data in a storage medium of the host computer system;
receiving operational data from each one of the plurality of mobile computing devices, where the operational data from each one of the plurality of mobile computing devices is based on input from a user that is in response to the displayed input queues;
retrieving sound data from the storage medium that corresponds to each operational data received from the plurality of mobile computing devices; and
outputting audio through an output on the host computer system based on the retrieved sound data, wherein the user input device includes a touch panel.

18. The method of claim 17, wherein each one of the plurality of mobile computing devices is set to process different parts of a plurality of parts of a musical composition, and the input queues are directional signs that indicate how the respective part on a mobile computing device of the plurality of mobile computing devices is to be played.

19. The method of claim 18, wherein a number of the plurality of parts is greater than the a number of the plurality of mobile computing devices, the method further comprising:
retrieving player-independent sound data for a part not processed by one of the plurality of mobile computing devices; and
outputting audio that is based on the retrieved player-independent sound data.

20. A game system configured to execute a game, the system comprising:
a hand-held device comprising:
a display that is configured to show indications of input to be performed by a user;
a touch panel overlaying the display, the touch panel configured to accept input from a user holding the hand-held device, the accepted input being in accordance with the shown indications; and
a wireless transmitter that is configured to send at least the accepted input, and
a stationary game processing apparatus comprising:
a storage medium configured to store a plurality of operation sound data pieces;
a wireless receiver that is configured to receive the accepted input sent from the hand-held device; and
at least one processor configured to:
process game data to generate a video image;
select at least one of the plurality of operation sound data pieces that corresponds to the received accepted input sent from the hand-held device;
load, from the storage medium, the selected at least one of the plurality of operation sound data pieces; and
output a sound signal based at least in part on the on the selected at least one of the plurality of operation sound data pieces.

21. The game system of claim 20, wherein the processing of the game data to generate a video image is based at least in part on the received accepted input sent from the hand-held device.

22. The game system of claim 21, wherein:
the display of the hand-held device is further configured to display a first image of the game at a temporal point in gameplay; and
the video image is different from the first image and is processed by the at least one processor to be output to a display device at substantially the temporal point in gameplay.

* * * * *